United States Patent [19]

Gregerson et al.

[11] 3,890,718

[45] June 24, 1975

[54] METHOD FOR DETERMINING ASTRONOMIC NORTH BY GYROCOMPASS

[75] Inventors: Leslie F. Gregerson; Gordon R. Symonds, both of Ottawa, Canada

[73] Assignee: Canadian Patents & Development Limited, Ottawa, Canada

[22] Filed: July 27, 1973

[21] Appl. No.: 383,117

[30] Foreign Application Priority Data
July 27, 1972  Canada............................... 148083

[52] U.S. Cl. ...................... 33/301; 33/324; 74/5.5; 324/186
[51] Int. Cl............................................. G01c 19/38
[58] Field of Search ....... 33/301, 324, 1 AP, 275 G; 356/152, 141; 74/5.5; 324/186

[56] References Cited
UNITED STATES PATENTS
3,577,646   5/1971   Eklund.................................. 33/301
FOREIGN PATENTS OR APPLICATIONS
1,552,879   12/1968   France.................................. 33/324
1,521,272   3/1968    France.................................. 33/324

Primary Examiner—William D. Martin, Jr.
Attorney, Agent, or Firm—Roman J. Filipkowski

[57] ABSTRACT

A gyroscope having one degree of freedom, suspended by a filar band for oscillation about a vertical axis with its spin axis in the horizontal plane tending toward North, is modified for determination of NORTH with high accuracy by providing a projected narrow beam of light indicating swing movement relative to a reference mark in a viewing port. A group of at least two and preferably three miniature photosensors spaced less than about 1° apart are employed with electronic timing apparatus, to generate signals precisely establishing time intervals of the passage of the beam from the response center of one sensor to the response center of the adjacent sensor and the interval between out and return crossings of the outer sensor. The timing observations are utilised in computational procedures based on new mathematical models of the behaviour of the swinging elements and on physical models of the sources of anomalous displacements and times, for establishing the accurate parameters of simple harmonic motion describing the rectified swing. A set of six or more determinations on a station of known latitude is shown to determine NORTH with a mean error of the order of 1 second of arc. The automatic observation of time intervals characterizing slow crossings by a relatively broad beam having a dimension in the direction of movement which is an uncertain magnitude comparable to the breadth of the sensor, is performed by gating pulses of a first train of frequency N while the sensor output exceeds a predetermined threshold level, and gating in the interval thereafter before the sensing of the beam by the adjacent sensor a train of pulses of frequency 2N, so that the count of pulses accumulated during two transit intervals and in the intervening interval effectively yields a center-to-center timing determination.

7 Claims, 26 Drawing Figures

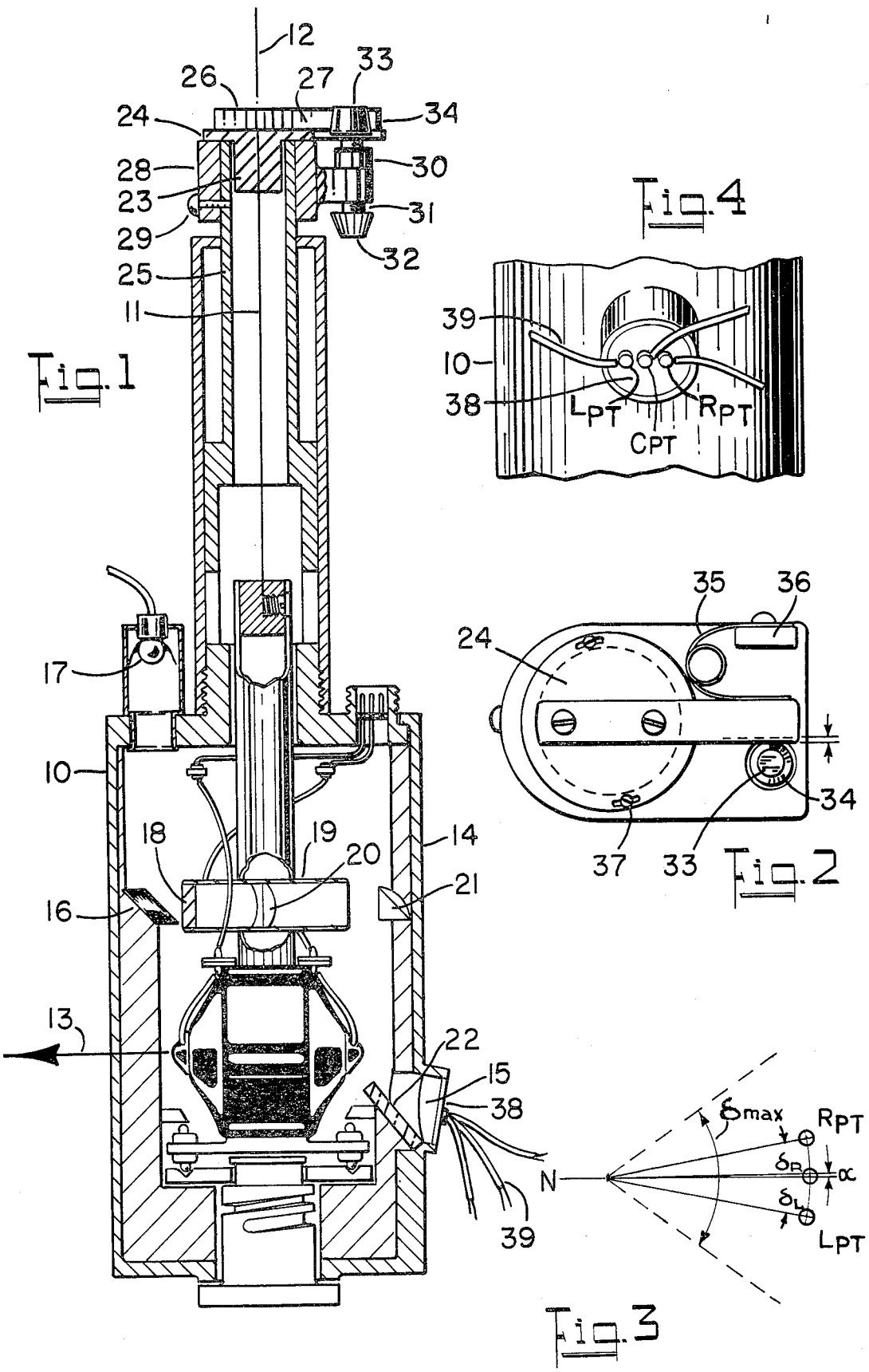

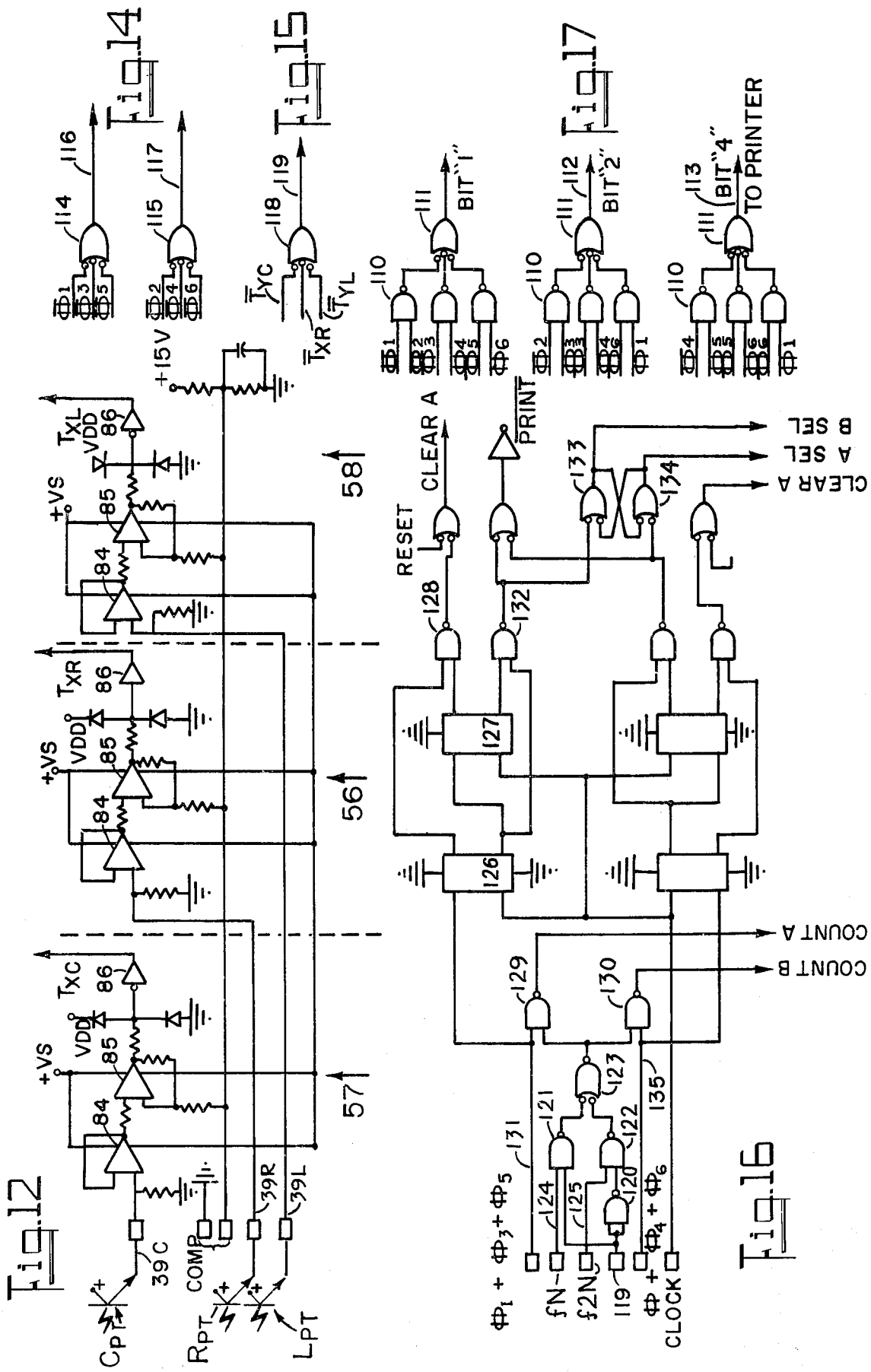

METHOD FOR DETERMINING ASTRONOMIC NORTH BY GYROCOMPASS

THE DEVELOPMENT OF THE GYROCOMPASS

Good weather permitting an unobscured view of the sun or a fixed star, together with precise chronometric timing of stellar body observations, are essentials in the taking of astronomical observations by theodolite for azimuth determinations. Thereafter, lengthy and laborious calculations utilising values tabulated in the FK-4 catalogue and its Supplement have to be carried out to derive the orientation of an astronomic direction relative to NORTH usually to an accuracy within one second of arc.

The gyroscope having one degree of freedom has a motor-driven rotor element which is suspended to hang within a housing from a slender metal band of low torsional elastic constant, and which is acted upon by the force of gravity passing through the mass center of the rotating element, so that the rotor hangs as a horizontal pendulum with the spin axis horizontal. By virtue of the high angular moment of inertia of the rotor when a spin velocity of the order of 800 radians per second or higher is imparted to it by a motor, such as an induction motor, to which a high frequency alternating current supply is connected, the spin axis tends to align itself into the direction of the centripetal vector of the Earth's rotation, regardless of the direction in which it points when the spinning rotor is released to swing freely. The gyrocompass is mounted on a rigid tripod stand in association with the frame of the theodolite so that the point of suspension is essentially fixed with respect to the earth, and therefore moves in space at an angular velocity of 0.00007292115121 radians per second about the earth's polar axis. If the rotor is urged out of its alignment of its spin axis coinciding with the Earth's centripetal vector, precession is caused about the gravity axis, that is, the direction of the spin axis turns in the horizontal plane toward Astronomic NORTH. This movement of spin axis toward the centripetal vector is an accelerating one, consequently the swing of the gyroscope does not stop when the alignment with North is reached, but due to the great moment of inertia it swings in a decelerating motion into the opposite direction. In this way the effect of the directive moment of the earth's rotation on the suspended gyroscope is set up an oscillation of the suspended mass, turning about the vertical rotation axis in the band as a torsion pendulum, the swing excursions to the East and West centering on North. If the suspension band contributes no restoring force, i.e. if the band is maintained with no torsion by moving the suspension support, the swinging mass will be observed to oscillate with extremely high accuracy about North. Such device will hereinafter in this specification be referred to as a 'gyrocompass'. The oscillatory movement is in fact only very slightly damped by the gas or air filling surrounding the frame within the exterior housing, and by frictional resistance in the band. If the spin axis is aligned very nearly in the North direction before run-up and release to commence swinging, the amplitude is smaller than if the axis is released from a random orientation.

The determination of Astronomic North might theoretically be made by allowing the oscillation of the spinning rotor to continue for a time sufficiently long so that the amplitude had become negligible, when the spin axis would align in the meridian. However in practice the oscillation practically never ceases, and even at its lowest or if deliberately damped does not provide a directional indication of satisfactory accuracy. Hitherto various observational methods have been resorted to, the ultimate aim of each of which has been to find the mid-swing position, either by observing the amplitudes of half-swings as by following a visible swing indicator element and reading rest points (elongations) on the gyrocompass scale; or by observing and recording the times of transit through the scale zero indicia and also through points spaced on each side from scale zero. In the first or "amplitude" method a light beam reflected from a mirror mounted on the suspended swinging frame in which the rotor is journalled is projected on a graduated scale visible in a viewing port in the exterior housing of the apparatus and the theodolite is utilised unlocked to permit manual or servo-drive manipulation of the suspension support element fixed on the gyrocompass outer housing to keep the moving light beam always on the zero scale indicia. At its extreme excrusion the rotor swing indicator appears to have stalled at which time the azimuth circle is rapidly observed and recorded. From two half-swings the mean value of the observed directions of the swing limits determines the North direction.

In the second or "Transit Point" method, the theodolite is clamped in an assumed North direction, which should be as near as can be estimated from available information, and the gyrocompass released to swing, the successive time intervals of the transit of the light beam through the scale zero indicia being recorded, and the times of transit through selected reference scale positions on either side being also recorded, for a number of swings. Allowance is made for the zero torsion torque direction of the suspension band, which causes an angular difference between the North direction and the theodolite circle reading obtained from difference in time of the East swings and the West swings.

The prior art proposals for amplitude determinations as represented in United States patents to Eklund, H.N. Re. No. 26,370; and Auer, W., No. 3,443,321, have the disadvantages that regardless of the means employed to sense the relative position between the following mechanism and the frame in which the rotor is journalled, the servo-drive system necessarily lags behind the followed part. This is because the error signal must increase to either side of zero through a threshold value, so that a finite discrepancy always occurs between the reversal point of the optical or electromagnetic element carried by the swinging gyrocompass and the reversal point of the following mechanism. If the pick-off operates at a radial distance of about 3cm. from the vertical axis of the band, the swing limit must be read to an accuracy of $\pm 0.2$ micron ($2 \times 10^{-5}$ cm.) to attain a North determination within $\pm 1$ second of arc. The followed swing also does not operate with constant zero torsion torque in the band due to hysteresis, stress-release phenomena, and possible temperature fluctuations.

The piror methods wherein an operator times transmits of a light beam indicator manually through points of the gyrocompass scale cannot yield high order accuracy of North determinations, because the response times of a human observer are far too slow and erratic.

DESCRIPTION OF THE INVENTION

Gyrocompasses of a high order of instrument excellence currently available are the GAK-1 made by WILD (Heerbrugg) Switzerland, and the Gi-B1 made by HUNGARIAN OPTICAL WORKS, (MOM) Budapest. Such gyrocompass/theodolite apparatus are rated as capable of determining North by conventional procedure with a standard deviation of ± 20 inches of arc for reproducible measurements. The direction of zero band torsion torque in such instruments is found prior to or after the determination of the swing means with spinning rotor, by releasing the unenergised, non-spinning gyroscope from its caged position, whereupon oscillation will be found to occur about the zero-torque (equilibrium) point of the suspension band while it was locked. The excursions of the rotor frame will center about the zero torque direction, which is read on the scale of the gyroscope in units of that scale, which values must be transformed into equivalent angular values.

The present invention relates to gyrocompasses provided with timing means of an extremely high order of resolving power for measuring intervals of time corresponding to consecutive portions of the left and right swings; permitting the solutions of hitherto undiscovered problems of interpreting anomalous swing behaviour. To this end, the invention provides an improved electro-optical reading system for indicating gyrocompass swing position employing at least two, and preferably three fixed spaced photosensitive elements responding to a light beam deflected by the swinging gyrocompass frame, to provide outputs which are fed to arithmetical computing means deriving, by reference to pulse trains from a crystal clock source, accurate printed time intervals defining all portions of the excursions of the gyrocompass spin axis.

The invention moreover embraces novel computational procedures based on mathematical models of the behaviours of the swinging elements and on physical models of the source of anomalous displacements and times, for establishing accurate parameters of the damped and deformed harmonic motion leading to precise determination of North. The procedures may be briefly stated as computations deriving the swing parameters of period, angular velocity, amplitude and alignment error of each half-swing, and employing weighting factors to separate therefrom the effects of:

i. speed change in the rotor after release to free swing;

ii. compound torsional and conical pendulous swinging behaviour;

iii. temperature-responsive torsional changes in the band, causing drift;

iv. time interval between observing non-spinning and spinning free-swing periods;

v. change in rotor velocity due to supply voltage change;

vi. increments and decrements in hysteresis in the band due to thermal changes and effect of alignment error.

According to the invention, the computational procedures may be carried out by human operator, or by special purpose computer means to which the time interval data and other fixed data are fed, or by means of a general purpose computer which has been programmed suitably. As will appear from the following description, consistent and repeatable determinations of North may be made with a standard deviation of ± 0,8 to 1,3 seconds of arc.

The invention will be made apparent in its principles and preferred embodiments which are next described in conjunction with the accompanying figures of drawing, wherein;

FIG. 2 is a plan view of the band adjustment device;

FIG. 3 is a plan showing swing and observation amplitudes;

FIG. 4 shows a frontal side elevation view of a viewing port and the relative position of photosensitive detectors when positioned for a timing determination;

Figure 9:
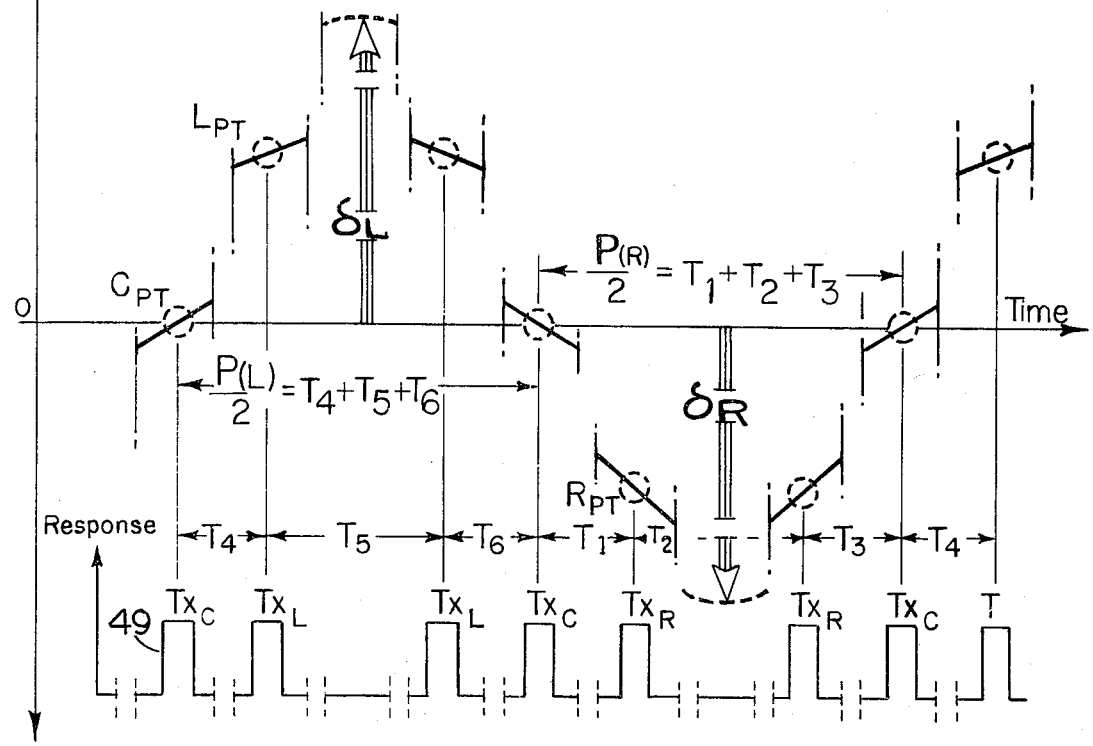
Figure 10:
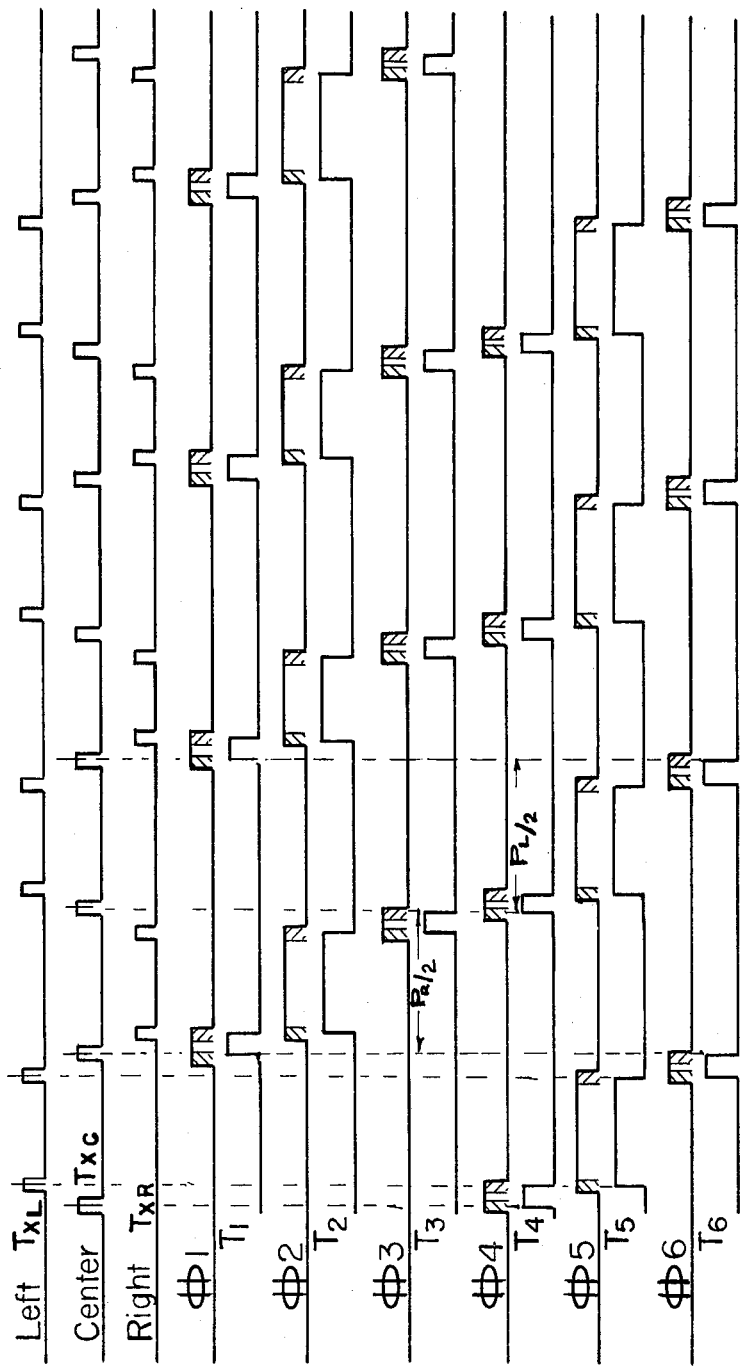
Figure 11:
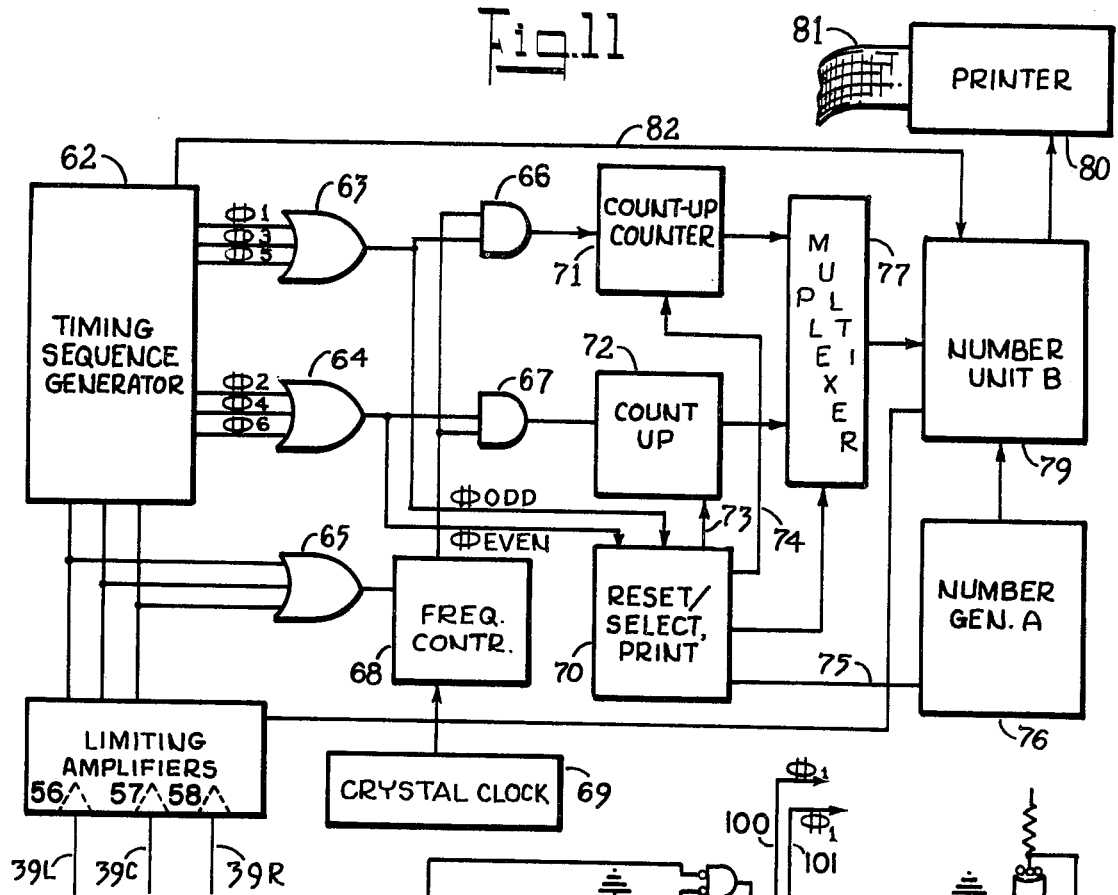
Figure 13:
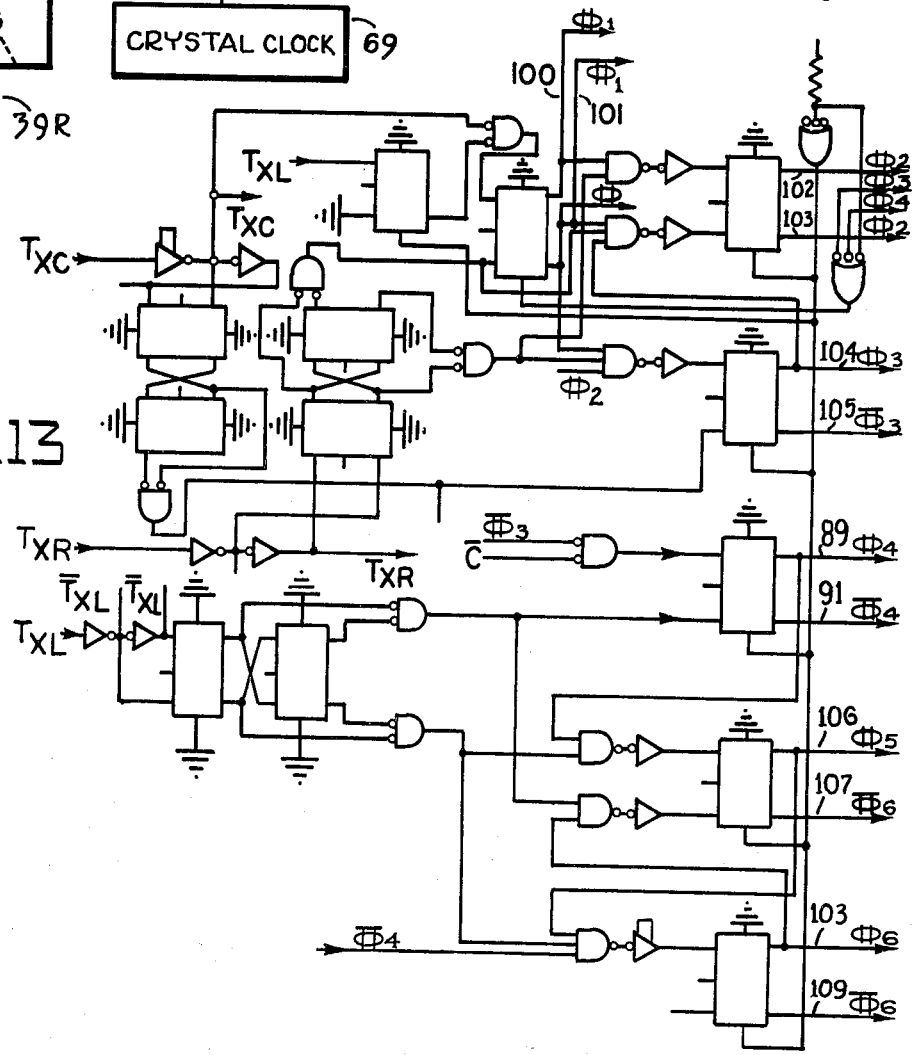
Figure 19:
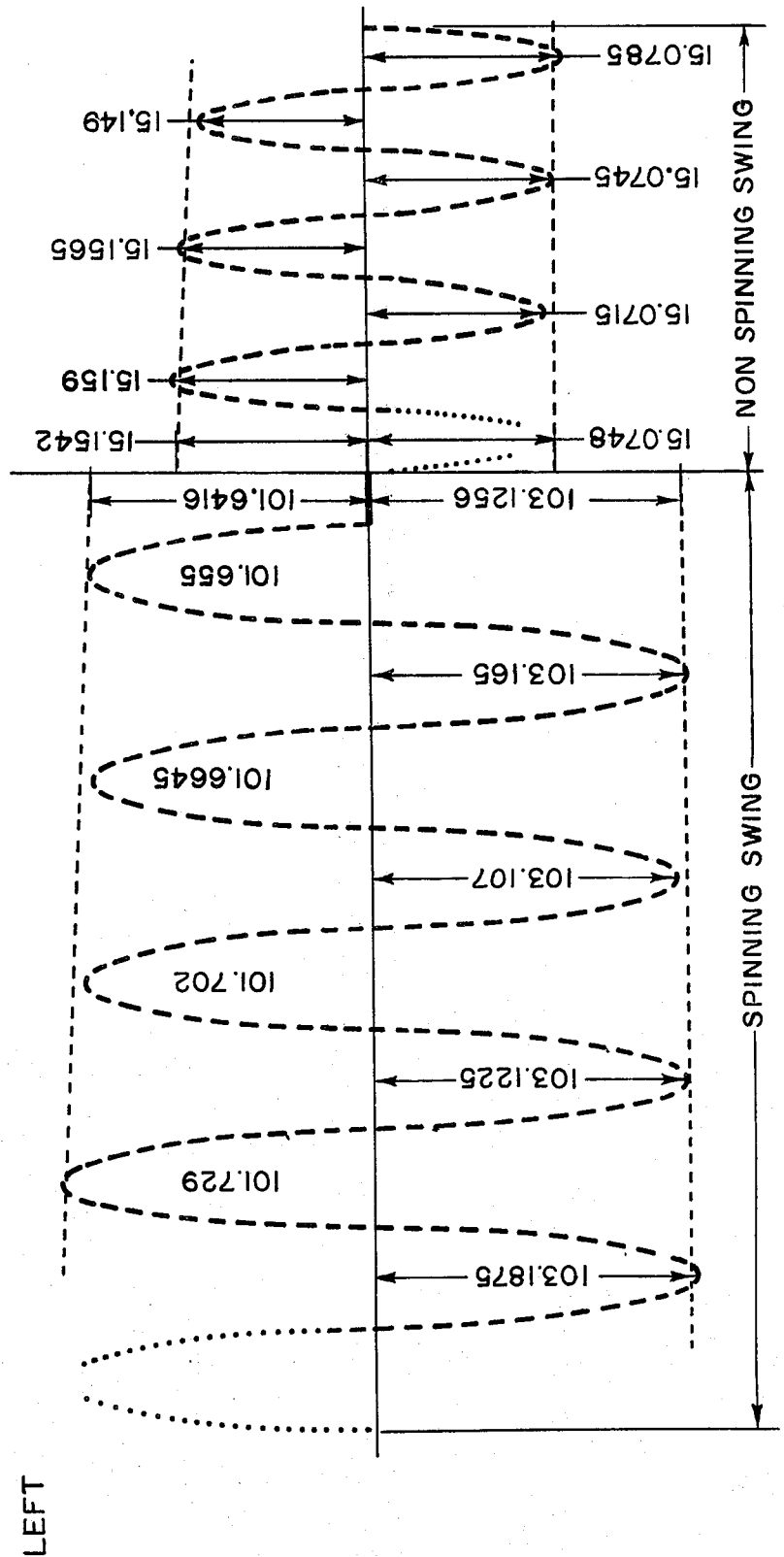
Figures 20, 21:
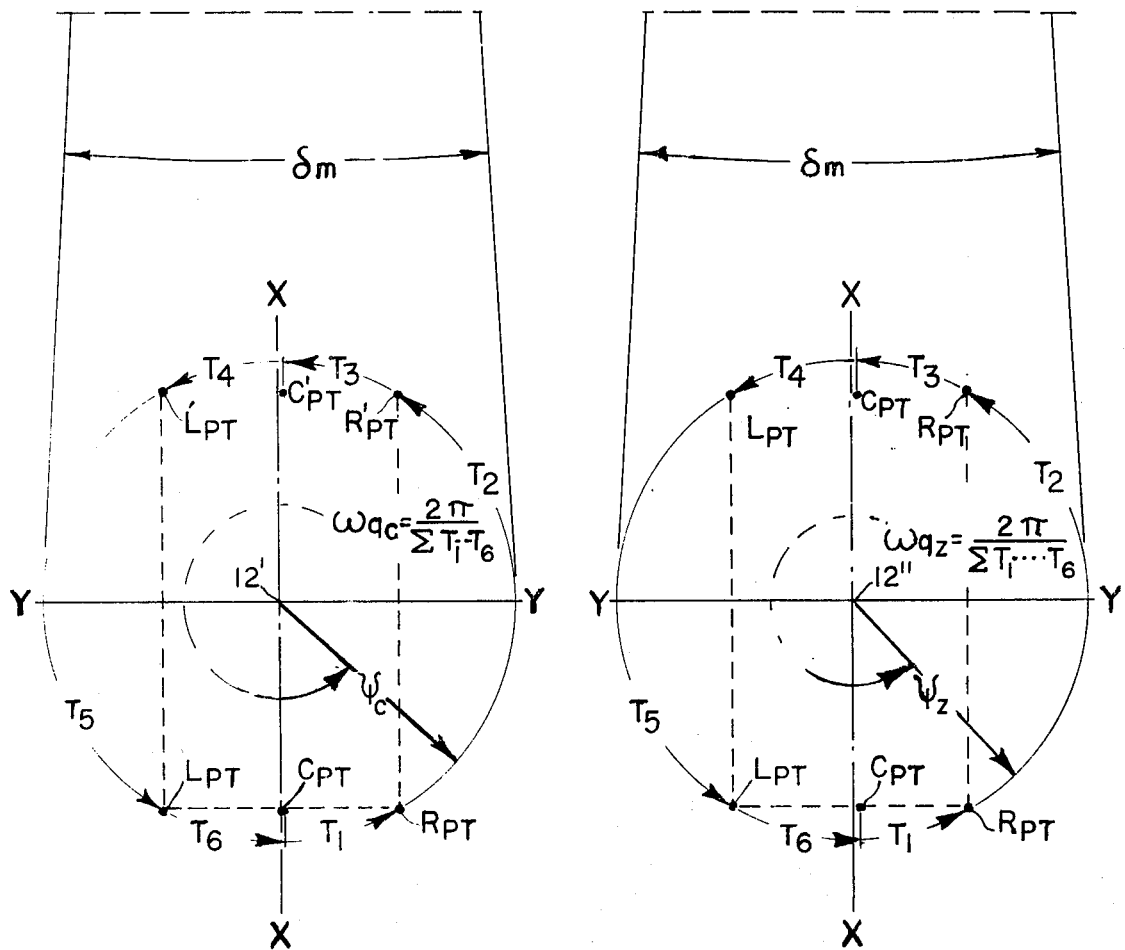
Figure 22:
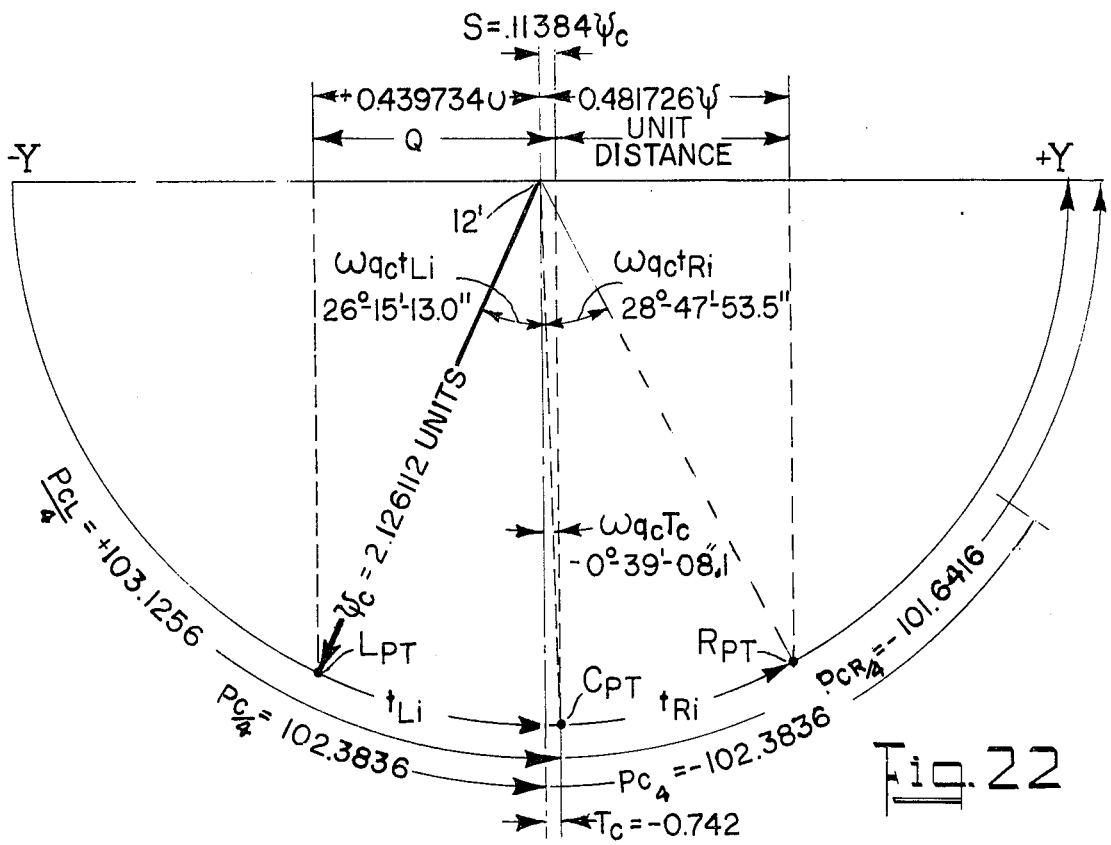
Figure 23:
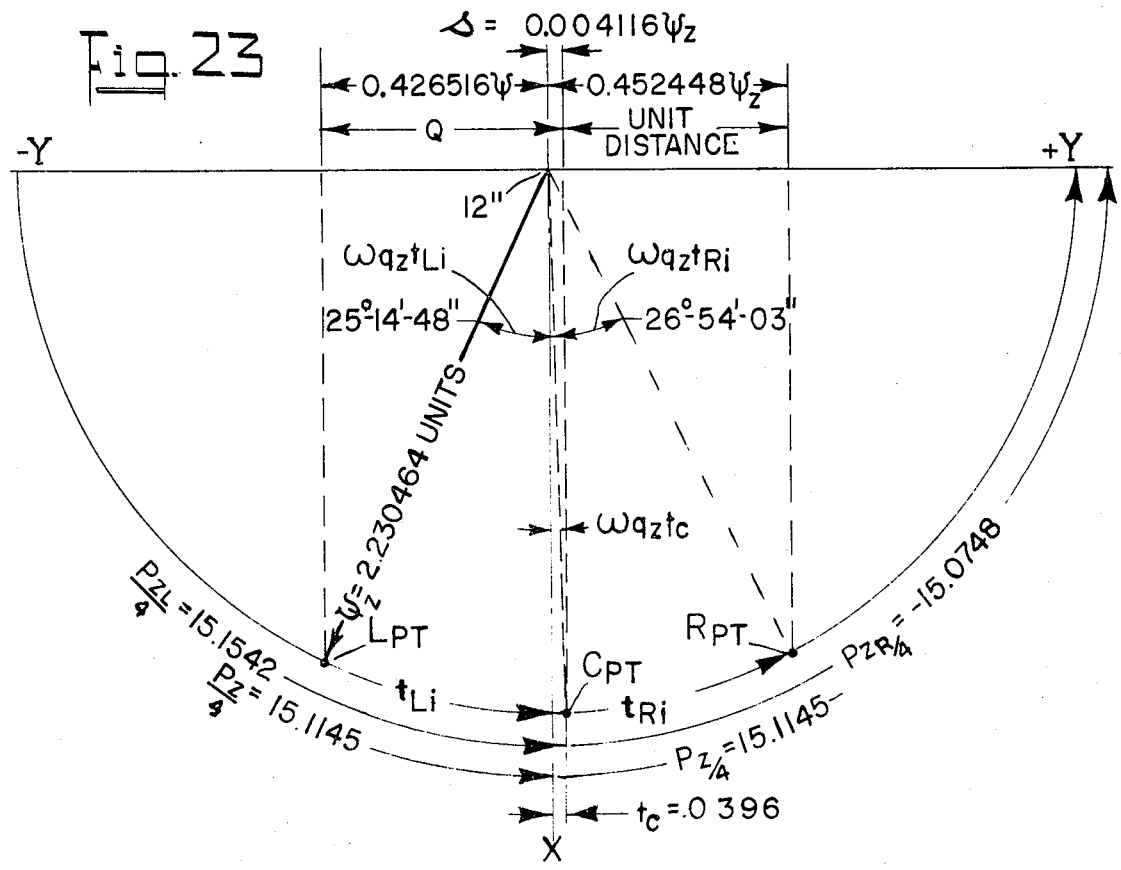
Figure 24A:
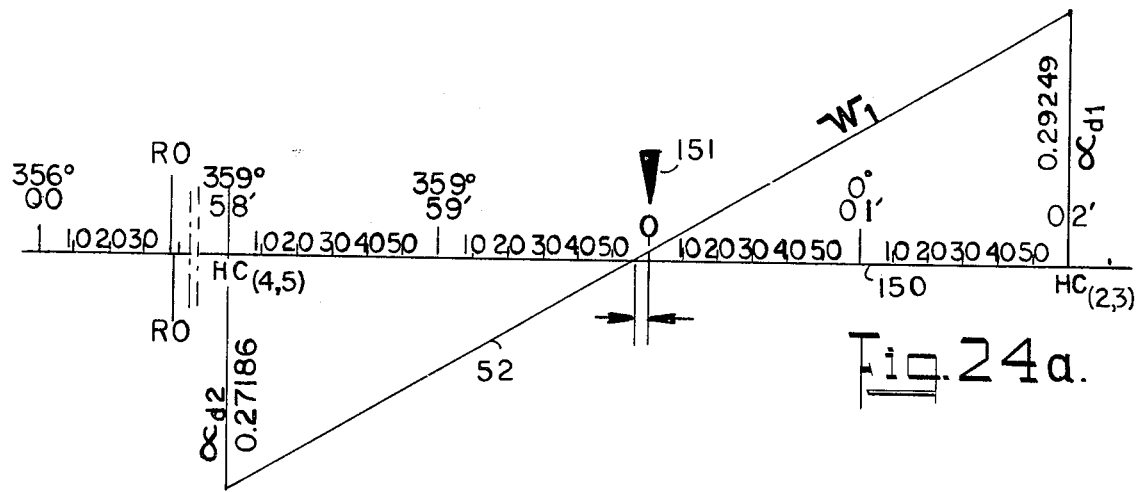

FIG. 9 portrays a series of time intervals relating to the transit of a light beam across the photosensitive elements;

FIG. 10 portrays time interval summation operations utilising constant frequency pulse trains and counters;

FIG. 11 is a diagram of functional blocks associated in the timing and recording apparatus of the invention;

FIG. 12 is a schematic circuit diagram showing limiting amplifiers generating the sensor output waveforms of FIG. 9;

FIG. 13 is a circuit diagram showing a Timing Sequence Generator;

FIG. 14 and FIG. 15 are circuit diagrams showing assembling of timing waveforms;

FIG. 16 is a diagram showing selection of frequency of pulse trains according to precursor and sensor transit intervals;

FIG. 17 is a circuit diagram showing interval identification for print-out apparatus;

FIG. 18 shows a multiplexer associated with two count-up counters;

FIG. 19 is a graphical representation of swing observations showing anomalies in period times and their rectification;

FIG. 20 and FIG. 21 are enlarged plan views showing the spin axis swing excursions and the derivatives of quasi-angular velocity $\omega_q$, for spinning and non-spinning gyrocompass swings, respectively;

FIG. 22 is a diagram showing derivatives of a proportional angular offset quantity S from timing reference $C_{PT}$ to the mid-period axis position for spinning swing;

FIG. 23 is a diagram similar to FIG. 22 showing proportional angular offset quantity S for non-spinning swing; and, FIG. 24a, b and c show the conversion of S and s offset quantities to true angular displacements from North, and correlation of solutions obtained from a series of observation sets made with predetermined East and West angular shifts of the timing reference point from an assumed North direction.

Figure 1B:
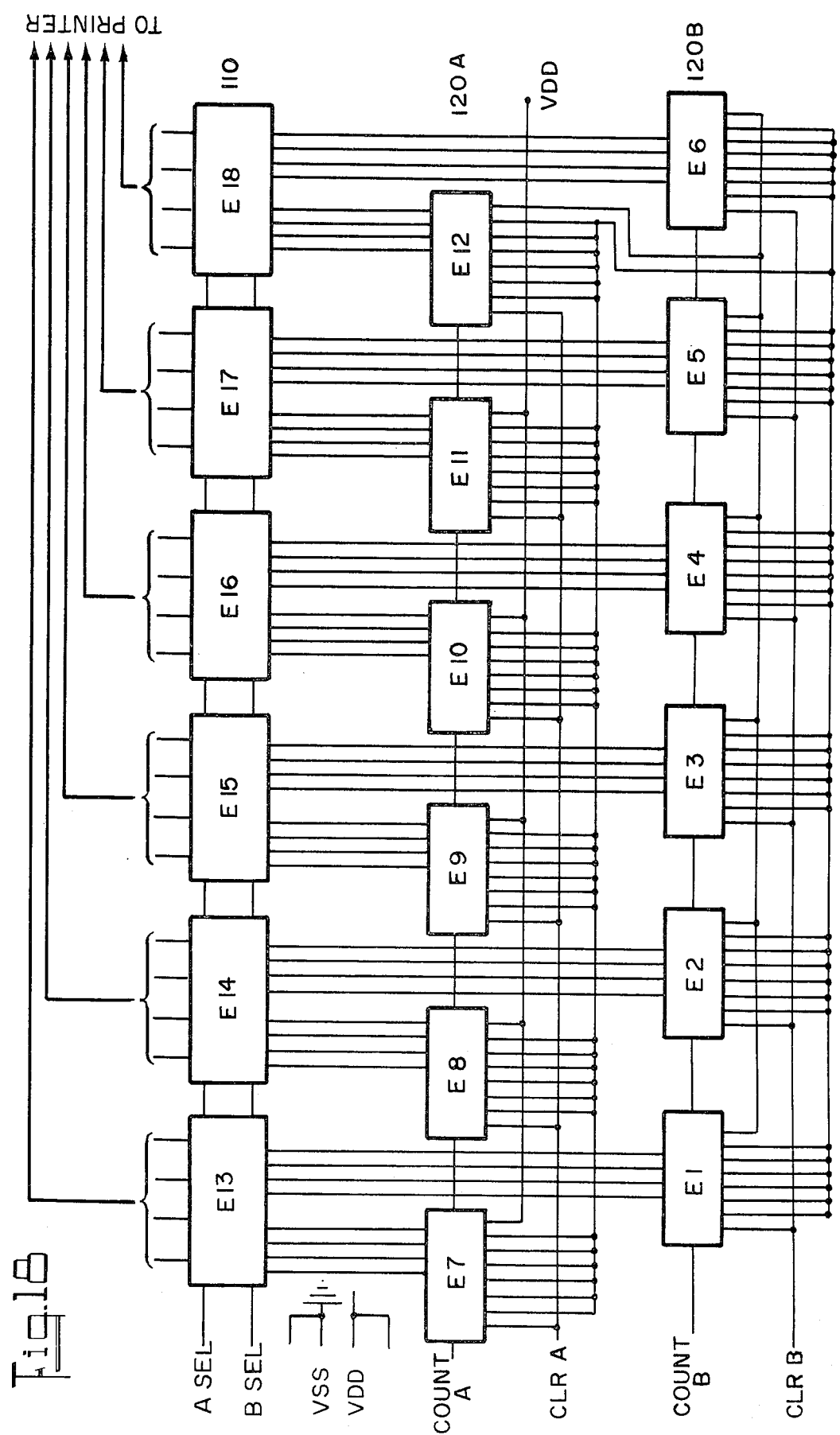
FIG. 1 is an elevational view partly in section showing one form of gyrocompass/theodolite incorporating the time-interval measuring devices of the invention.

The gyrocompass illustrated in FIG. 1 generally designated 10 having one degree of freedom, is freely suspended without damping by a filar band 11 along which the vertical swing axis 12 lies, and has a rotor member in which the spin axis is horizontal, indicated by the arrow 13. An exterior housing 14 provided with a viewing port 15 and a mirror system comprising arcuate first mirror 16 directing a beam of light from a lamp 17 disposed externally of the housing in an axial direction from the rotor but offset to one side of band 11 provides a narrow light beam passing through a slit 18 in tube 19. The slit provides a narrow light beam that is focussed by lens 20 and reflected from fixed prism 21, and plane fixed mirror 22, as a vertical illuminated indicator element having a width of about 30 microns in the port 15.

The upper end of the filar band 11 is carried on a plug member 23 that is journalled for rotation about the axis 12 in the center of the filar band, and which carries a plate portion 24 overlying the upper end of tower 25. The plug 23 is adjustable with respect to the outer housing 14 for setting the angular relationship of the band with respect to the housing, and specifically to assure that the light beam indicator element is centered in port 15 when the gyrocompass is in non-spinning mode and hanging freely. The adjusting device comprises an integral arm 26 extending radially from plate 24. One face 27 of the arm is bevelled to a small angle with respect to the vertical, i.e. about 4° of inclination. A support 28 of tubular form mounted on the upper end of tower 25 as by grub screws 29 carries a micrometer sleeve 30 carrying internal threading, in which the adjusting screw 31 is threadedly received. The screw carries a manipulation knob 32 on its lower end and its upper free end 33 has a conically bevelled face 34 of the same angle as the arm 26, both surfaces being hardened and polished. Any rotation of the control screw advances or retracts the conic end in a vertical direction, tending to rotate arm 25 when advanced, while biasing spring 35 interposed between the bracket 36 and the opposite face of arm 26 maintains the hardened faces in close contact. After a setting is made, the plate 35 may be secured on one end of the tower by means of fine setting screws 37. The device permits setting the band torsion torque equilibrium point very close to the reference mark of the registration system without opening the gyrocompass casing.

As may be seen from FIG. 3 the swing of tube 19 carried by the gyroscope causes the light beam to sweep across port 15, passing over miniature photosensor elements $L_{PT}$, $C_{PT}$ and $R_{PT}$, which respectively lie in the path of the beam as viewed from the outside of the port 15, and are spaced as nearly equidistantly as possible so that excursion of the light beam through the angles $\delta_L$ and $\delta_R$ with respect to a scale zero position does not exceed about 1° 52'. In practice, the extreme swing of a gyroscope is restricted to less than 4° to avoid stressing the filar band in most instances the magnitude will be about 3 $\delta_R$ and 3 $\delta_L$ to each side.

Figure 6:
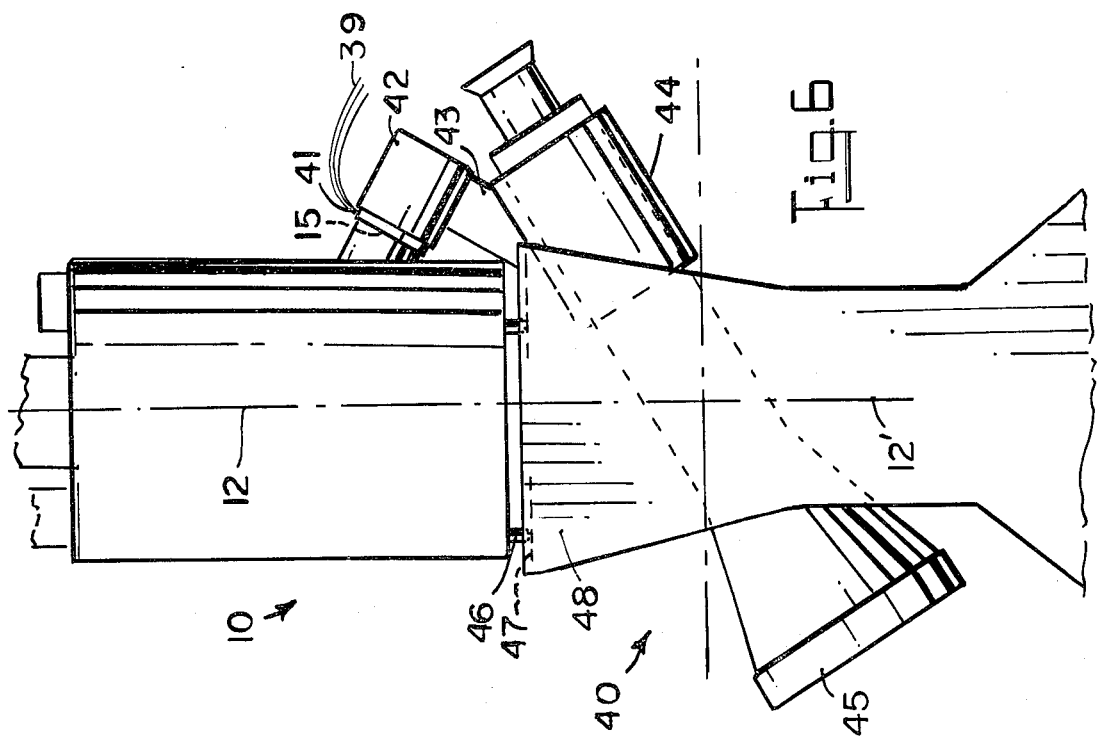
FIG. 6 shows a preferred mounting of an observation group of photoelements on a theodolite telescope in reading position.

The photosensor elements preferably are miniature silicon photo-transistors, having a light-sensitive elemental area of the order of 15,000 square microns (15 $\times$ 10$^{-5}$ sq. cm.) These are mounted either on a translucent support plate 38 in the viewing port 15, from which leads 39 extend to counter apparatus to be described later, or preferably as shown in FIG. 6 the photoelements are mounted to move with the barrel of the theodolite telescope with which the gyrocompass is associated as will be more particularly described at a later point.

THE EFFECT OF BAND TORSION TORQUE

Figure 5:
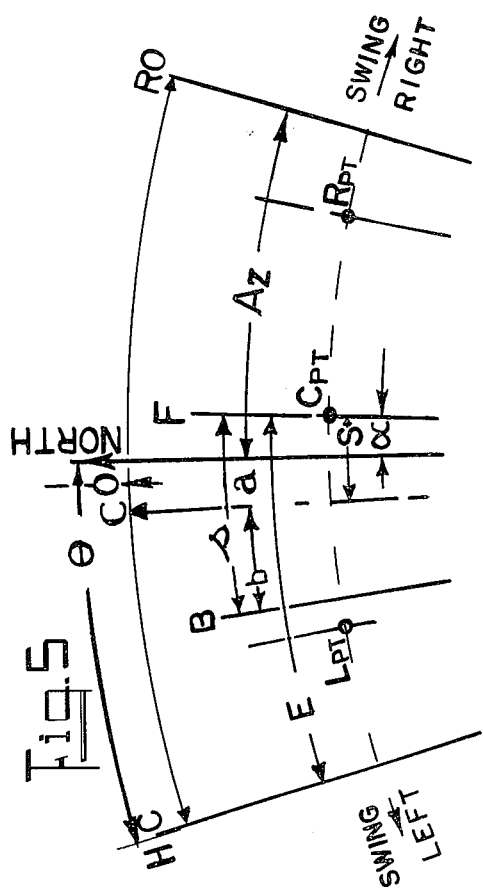
FIG. 5 is a plan diagramming angular quantities involved in the determination of North.

It is essential for the purpose of describing the role of the present invention in enabling precise determinations of North to be made with a gyrocompass, to analyze the deviations from the Astronomic North indication intrinsic in the simple harmonic swing of a theoretical perfect suspended spinning gyroscope caused by various disturbing forces and fixed angular errors in the indicator elements of a practical gyroscope. Referring to FIG. 5, showing parameters for both spinning and non-spinning swing, F is the direction of the center phototransistor $C_{PT}$ relative to the axis 12 of the gyrocompass;

B is the direction of zero torsion torque position of band 11, coinciding with equilibrium for non-spinning swing;

C is the direction of the equilibrium position, i.e. apparent North indicated by the half-period time of spinning gyrocompass swing;

'North' is the direction of Astronomic North;

$\alpha$ is $S + a$, where:

S is the angle between the equilibrium direction and the center phototransistor $C_{PT}$ for spinning swing;

$a$ is the difference between North and the equilibrium direction for spinning swing, $= kb$;

$b$ is the torque angle when the band is turned into the equilibrium or apparent North indication position C;

$s$ is the angular difference between the timing center of phototransistor $C_{PT}$ and the zero torsion torque position of the band 11 for non-spinning swing, $= S - b$;

HC direction the directoin of the optical axis of the telescope at a given theodolite circle setting;

E is the angle between the center element $C_{PT}$ and axis HC.

An important relationship is the ratio of the angles $a$ and $b$, namely, $$a/b = k \qquad (1)$$

where $k$ is a proportionality factor between the restoring force of the band in torsion, and the directive moment of the spinning rotor of the suspended gyroscope.

From an inspection of the foregoing, the relationship in azimuth of Astronomic North to reference object (RO) can be defined if the constant E is known or can be determined.

$$AZ = RO_{az} + HC_{az} + E - (S + a) \qquad (2)$$

where $RO_{az}$ signifies the apparent (gyrocompass scale) angle azimuth.

Niether $a$ nor $b$ can be determined as a constant, because of the changing value of band torsion torque relative to the gyroscopic torque due to earth's rotational motion about its axis.

The quantities S and $s$ can however be measured to a high order of accuracy from time interval measurements referred to a timing reference point in the sensor $C_{PT}$ as will be described hereinafter; the ratio $k$ is also precisely determinable, from accurately timed periods of gyrocompass swinging, for both spinning and non-spinning modes, by the method to be particularly described at a later point under the heading

CHANGES IN RATIO OF BAND TORSION TORQUE TO DIRECTIVE MOMENT DUE TO EARTH'S SPIN.

The quantity $\alpha$, which has been defined as $\alpha = (S + a)$ and which is the measure of the angular difference between North and the timing reference point in $C_{PT}$, is readily computable from these three parameters, as follows:

$$a = \alpha - S$$
$$b = S - s$$

Whence:

$$(\alpha - S)/(S - s) = k \tag{3}$$

GYROSCOPE BEHAVIOUR

The theoretical oscillatory motion of the gyroscope suspended for free swing and supported by a filar band may be expressed by the following relations:

$$P_c^2 = 4^2 \cdot (J + A)/(\tau + D) \tag{4}$$

and $$P_z^2 = 4\pi^2 \cdot J/D \tag{5}$$

where:
- $P_c$ is the period of spinning swing;
- $P_z$ is the period of non-spinning swing;
- A is $N^2/WL$ where:
- N is the angular momentum of the spin;
- WL is the moment of gravity;
- W is the weight (g.M) of the rotor;
- L is the distance between the lower clamp of the suspension band and the axis of the rotor
- $\tau$ is the directive moment of the eath's rotation;
- D is the directive moment of the band torsion torque;
- J is the moment of inertia of all swinging parts about the swing axis.

If the values of J, A, $\tau$ and D are assumed to be constant, it may be shown that $$k = D/\tau \tag{6}$$

In a gyrocompass which necessarily operates in ambient temperatures which may change from location to location and even with the hour of the day, the equilibrium temperature within the exterior housing is not constant. Heat equilibrium is reached when the mass enclosed within the outer housing reaches a temperature at which heat outflow by conduction to the air and radiation balances the heat generated by all sources. These are:
1. bearing friction;
2. resistance of filamentary lead-in wires;
3. resistance losses in motor conductors, and hysteresis loss;
4. heat emitted by light bulbs.

The foregoing may be simply totalled by taking the input volt-ampere product at the indicated power factor.

In gyrocompasses of good design the swinging and spinning parts are made of metal alloys which exhibit very slight dimensional changes with temperature; for all practical purposes the effects of moderate temperature changes in such components may be taken as negligible. However, the filar suspension band has been observed to exhibit significant alterations of its modulus in torsion; for example, at a temperature of 19.3°C a non-spinning swing period of 62.34 seconds was observed, while the period observed at a temperature of + 1.2°C was 61.92 seconds, and for a temperature of 24.6° was found to be 62.42 seconds. The rate of change with temperature has been found to be very nearly linear.

Where portable storage batteries are used as the power supply to a frequency inverter device to provide 400 cycle AC electrical supply, and the rotor forms part of an induction motor, variations in spin velocity may be significantly large, hence due consideration of such factor must be taken in any set of measurements. Both the magnitude of $\tau$ and A may be shown to change with rotor spin velocity, since the term $\omega$ appears in the defining relations of these parameters:

$$\tau = I \, \Omega_{sp} \cos\phi \tag{7}$$

$$A = I^2 \, \omega_{sp}^2 \tag{8}$$

Where:
- $\omega_{sp}$ is the angular velocity of the spinning rotor;
- I is the moment of inertia of the flywheel about the axis of spin;
- $\Omega$ is the angular velocity of the earth in space; and,
- $\phi$ is the latitude.

CHANGES IN RATIO OF BAND TORSION TORQUE TO DIRECTIVE MOMENT DUE TO EARTH'S SPIN.

The $k$-factor is the relation between the torque of the suspension band and the torque of the earth's centrifugal force of rotation. That is, $$k = D/\tau \tag{6}$$

where the band torsion coefficient D is found as $\mu d \cdot h^3/3l$, the quantities $d$, $h$ and $l$ denoting band thickness, breadth, and length dimensions respectively, and $\mu$ is the modulus of the material.

As the centrifugal force changes with latitude, it is also usually stated that at any place of latitude $\phi$:

$$k_\phi = k_E/\cos\phi \tag{9}$$

where $k_E$ is the equatorial value of $k$.

The general formulae for the motion of the suspended gyroscope are:

$$P_f^2 = 4\pi^2 \, A + J/\tau \tag{10}$$

$$P_c^2 = 4\pi^2 A + J/\tau + D \tag{4}$$

$$P_z^2 = 4\pi^2 \cdot J/D \tag{5}$$

where $P_f$ is the period of the spinning swing, when the band torque is kept to $D = 0$, either by following the gyroscope's movement by the theodolite when the gyroscope is supported by the transit, or by automatic following mechanism.

$$N = I \cdot \omega_{sp} \tag{11}$$

where N is the gyroscopic moment torque of the gyroscope's flywheel;

$$A = N^{2/}W.L \tag{12}$$

If we successively observe periods $P_c$ and $P_z$ on two stations about 10° apart in latitude angle, the value of K-factor can be calculated from the damped spinning and non-spinning swing times ($P_c$ and $P_z$). On these stations equal temperatures must be maintained and care must be taken to employ batteries equally charged if voltage and current are not stabilised by the inverter.

Assuming $J = 1$ we can write from the foregoing equations:

$$P_{c_1}^2/4\pi^2 \Omega \cdot \cos\phi_i \cdot N + P_{c_1}^2/P_{z_1}^2 = N^2/W.L + = N^2/g_i ML + 1 \tag{13}$$

from which $$N^2/ML - P_{c_1}^2/4\pi^2 \cdot g_i\Omega\cos\phi_1\, N = g_i(P_{c_1}^2/P_{z_1}^2 - 1) \tag{14}$$

For the two stations we may write the matrix as $$\begin{vmatrix} 1 & -a_1/\phi \\ 1 & -a_2/\phi \end{vmatrix} \begin{vmatrix} m \\ N \end{vmatrix} = \begin{vmatrix} b_1/\phi \\ b_2/\phi \end{vmatrix} \tag{15}$$

where:

$$\frac{a_1}{\phi} = \frac{P_{c_1}^2}{4\pi^2} \tau_i \Omega \cos\phi_i \tag{16}$$

$$\frac{b_1}{\phi} = g_i\left(\frac{P_{c_1}^2}{P_{z_1}^2} - 1\right) \tag{17}$$

$$m = N^2/ML \tag{18}$$

Solving it for N, m, we obtain $$ML = N^2/m \tag{19}$$

Once the numerical value of W.L (or more properly, g.ML) has been determined for a gyroscope, when the k-factor can be determined from period times $P_z$ and $P_c$, by using the following formulae:

$$P_c^2\, 4\pi^2/ = A + 1/\tau + D = (N^2/WL + 1)/(N\Omega\cos\phi + 4\pi^2/P_z^2) \tag{20}$$

Setting $x = (\Omega \cos\phi 2WL.P_c^{2/})/8\pi^2$ \hfill (21)

and $Y = WL\,[P_c^2/P_z^2 - 1]$ \hfill (22)

Then:

$$N = x + \sqrt{x^2 + Y} \tag{23}$$

Extending further relations (7) and (11) by the foregoing, $$\tau = N\Omega\cos\phi \tag{24}$$

and $$k = 4\phi^2/(p_z^2 \cdot \tau) \tag{25}$$

EFFECT OF OSCILLATION IN THE MERIDIAN

Although the desired motion of the suspended mass when released is oscillation about the vertical axis of the band as a torsion pendulum, it has been found that there may be a compound motion, due to additional oscillation of the mass as either a simple pendulum or even as a conical pendulum. The end of the spin axis, therefore, may gyrate, following an elliptical path, and the transits of the light beam across the phototransistor elements is affected by the deviation of the axis 12 from the vertical. The condition results in a consistent difference between the half-period of swings right and left, as may be comprehended by observing that the light slit 18 is located relatively near spin axis 13 as compared with the suspension point of the band in plug 23, hence at a time when the gyroscope is slightly displaced away from mirror 21 the deflection of the beam in the port 15 will appear to have a higher velocity of swing than when the suspended mass may be slightly displaced toward the mirror. The importance of this phenomenon must be recognized, since a lateral deviation of 0.2 microns of the apparent position of the light beam relative to the photoelements produces a directional error of about one second of arc.

The effects of dislevelment also change the optical arm length between the slit 18 and mirror 21, or the relation of the gyrocompass vertical axis to the vertical intersection of the optical axis of the theodolite and hence will alter the constant E.

Any dislevelment occurring during sets of observations alters the proportionality factor W used in computing the true $\alpha$ angle values.

THE PRECISE TIMING OF SWINGS

The swing period of the suspended mass is by no means an unvarying parameter at a given observation point; according to the present invention a system of electronic timing intervals is employed to derive:

i. the time interval $T_4$ equal to the difference in times of transit of the light beam across $C_{PT}$ and $L_{PT}$;

ii. the time interval $T_5$ equal to the difference in times of two consecutive transits of the light beam across $L_{PT}$;

iii. the time interval $T_6$ defining the difference in times of the transit of the light beam across $L_{PT}$ and $C_{PT}$;

iv. the time interval $T_1$ defining the difference in times of transit of the light beam across $C_{PT}$ and $R_{PT}$;

v. the time interval $T_2$ defining the difference in times of two consecutive transits of the light beam across $R_{PT}$; and, vi. the time interval $T_3$ defining the difference in times of transit of the light beam across $R_{PT}$ and $C_{PT}$.

Figure 7:
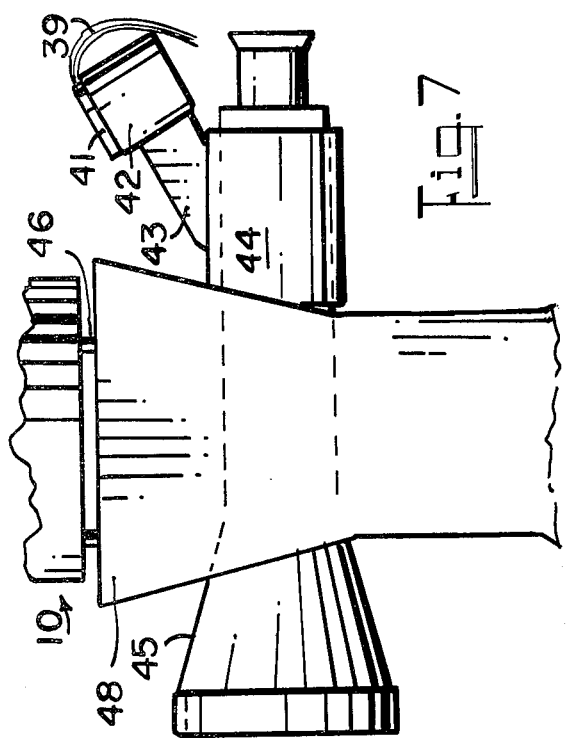
FIG. 7 shows the apparatus of FIG. 6 with the theodolite in normal use.

The relationships of these intervals may be understood by referring to FIGS. 3, 9 and 10, in conjunction with FIGS. 6 and 7 showing a mounting and positioning arrangement of the photoelements. The relationship of the center element $C_{PT}$ to the optical axis of HC of the telescope 45 is preferably such that the offset E (FIG. 3) of the sensor from the vertical plane containing the optical axis is as small as possible, for a perfectly levelled theodolite base 40. The theodolite is provided therefore with a mounting plate 41 which supports the group of phototransistors embedded therein, carried on a tubular part 42 fixed by a frame 43 to a sleeve 44 rigidly secured upon the telescope barrel 45. When the telescope is rotated about the transverse axis, plate 41 is closely fitted against the port 15. By virtue of the precise alignment of the vertical axis 12' of the theodolite with the vertical axis 12 of the gyrocompass, effected by means of the three hardened sphereical-ended pins 46 carried by the gyrocompass base which are force-centered in three V-grooves 47 recessed into the surface of bridge 48 of the theodolite frame, any offset between the gyrocompass zero-scale position - which need not be marked, but may be assumed to lie in the center of port 15 — and the vertical plane including the optical axis of the telescope, is a constant included with the error quantity E.

This arrangememt has the great advantages that both the theodolite and gyroscope observations are referred to the same reference, the telescope itself, the effect of any small change in the physical relation of gyroscope and theodolite, which may be a change of many microns, thereby becomes eliminated.

Figure 8:
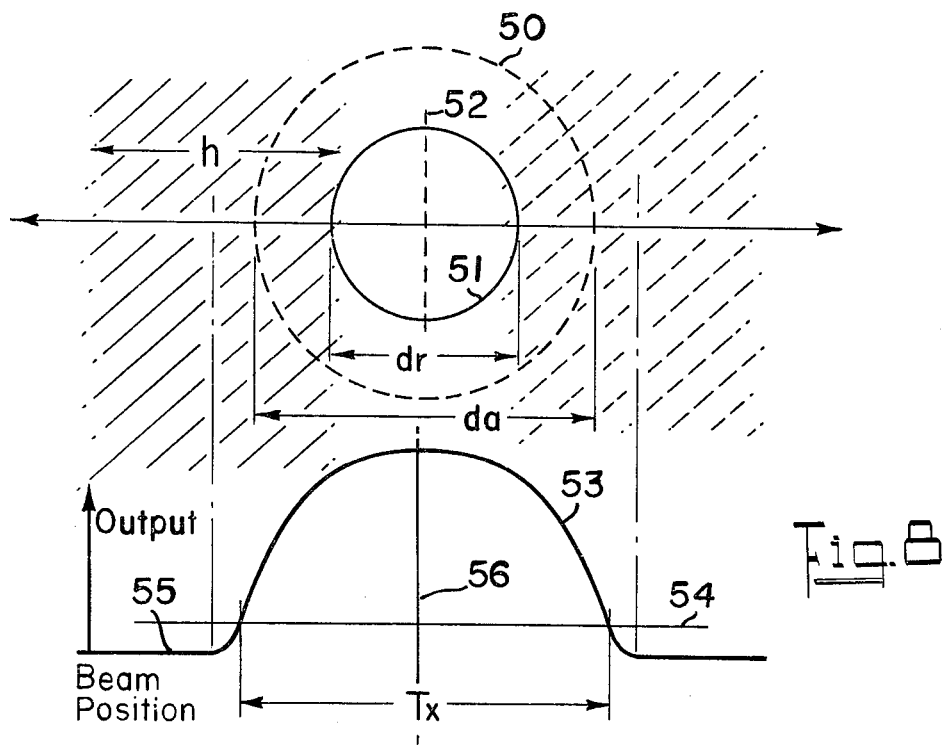
FIG. 8 is a representation in enlarged scale of the response of a photosensitive element to a light beam.

When the telescope is moved into reading position as in FIG. 7 the observation head 42 is automatically separated from the gyrocompass, permitting if Referring to FIG. 8, the sensing area of the photosensitive element may be represented by the dashed circular outline 50, having a measurable diameter $d_a$, corresponding to the aperture dimension. While the area is shown for purposes of illustration as circular, certain elements are provided with rectangular or square windows. It is a characteristic of such elements that the actual responding area is representable by the smaller area bounded by solid outline 51. The electrical response center may be represented by the vertical dashed line 52 more or less bisecting the element. As previously stated, the physical window within the circle 50 may be more than 100 microns in transverse dimension, with the responding area of some indefinite lesser dimension $d_r$. In practice, the light beam, shown by the dashed hatching of breadth $h$ has an indefinite lateral extent and intensity distribution in the transverse dimension. A serious problem therefore was encountered in obtaining a valid reference time defining the transit of the light beam across the phototransistor, which in the diagram is presumed to be from left to right or right to left, i.e. in the direction of the $h$ dimension.

For a given constant illumination by the source 17, the electrical output delivered by the photosensor when the beam impinges the responding area will be representable by a relatively flat-topped waveform 53 relative to the zero-output level 54. Inspection of the waveform when rising from level 54 of decreasing to that level, reveals that a non-linear response curve portion merges with a more regular portion of the higher output levels; by arbitrarily choosing a threshold level 55, the response time interval $T_x$ will faithfully represent the transit time whether the beam is moving right or left. Since the inverval corresponds with a physical dimension of perhaps 125 microns, the beam velocity may be safely approximated to be constant over the interval. The mid-point of the interval $T_x$ may therefore be found by dividing it into two equal halves, the center point being shown as the vertical 56. This line may or may not coincide with the apparent response center 52 of the element, but any error will be a constant which will be taken into account in the computational processing to be described later.

It is desirable to select the phototransistors for relatively symmetrical response waveforms, and to match the three elements $L_{PT}$, $C_{PT}$ and $R_{PT}$ for each set, and to periodically measure their outputs to maintain uniformity between them.

Referring particularly to FIG. 9, the scheme of precise timing of intervals of a swing left and a swing right each of which may be as much as 200 seconds in length for spinning swings, is shown with the time scale greatly compressed by omitting all portions of the swings except narrow time intervals including the transit time across each photosensor. The response intervals are depicted below the swing curves also in expanded time scale, as a discontinuous waveform 49 wherein the actual transit intervals are identified as $T_{xc}$, $T_{xL}$ and $T_{xR}$. These half-periods, designated $P_{L/2}$ and $P_{R/2}$ respectively, comprise:

$$P_{L/2} = T_4 + T_5 + T_6 \quad (26)$$

$$P_{R/2} = T_1 + T_2 + T_3 \quad (27)$$

and the period of the swing is the sum:

$$P = P_{L/2} + P_{R/2} \quad (28)$$

In each of the intervals $T_1 \ldots T_6$, the interval is defined between the response centers of each phototransistor output, i.e. between the half-points indicated by line 56.

TIMING AND RECORDING OF OBSERVATIONS

Referring to FIG. 11, the system of automatic observation of swings indicated by a projected light beam generally comprises a group of limiting amplifiers 56, 57, 58 receiving as inputs on lines 59, 60 and 61, respective $T_{xL}$, $T_{xC}$ and $T_x$ transit interval output signals generated by sensors $L_{PT}$, $C_{PT}$ and $R_{PT}$. The limited, square-waveform signals of the form shown in FIG. 9 are passed to a TIMING SEQUENCE GENERATOR 62 which performs the functions represented in FIG. 10 of generating the precursor time intervals $\Phi_1 - \Phi_6$.

The odd-subscript precursor interval signal outputs of generator 62 are delivered to OR GATE 63, the even-subscript intervals to OR GATE 64, and the transit interval signals to OR GATE 65, the respective outputs of which are fed to AND GATES 66 and 67 and FREQUENCY CONTROL unit 68. A source of precisely frequency-controlled pulse trains such as a CRYSTAL OSCILLATOR 69 delivers a 500 Hertz and a 1000 Hertz signal to unit 68. The block 70 labelled RESET/SELECT & PRINT LOGIC also receives the assembled odd-subscript and the assembled even-subscript precursor interval signals. The AND GATES 66 and 67 are also fed an output of selected frequencies conditional upon the signal delivered from OR GATE 65, so that their outputs are respectively led to COUNT-UP COUNTERS 71 and 72. The counters receive control signals on respective lines 73 and 74 from LOGIC UNIT 70, which provides a control via line 75 to NUMBER GENERATOR 76(A).

The counter outputs are fed to MULTIPLEXER 77 which obtains a LOGIC control via line 78 and which delivers 6-digit data on 24 lines to the NUMBER GENERATOR 79(B). The outputs of generators A and B are taken to the PRINTER 80 which provides a decade number printed output on paper 81 upon the termination of each precursor interval. A further control to the printer is provided on line 82 from the unit 62 to identify the precursor interval during which a count of time intervals — preferably in milliseconds — has been completed and printed. An output is also provided on line 83 to printer 80, identifying the first signal appearing on lines 59, 60, 61 signifying the direction to which the light beam was initially observed to swing, for marking observations.

| $\Phi_1$ | $\overline{\Phi_1}$ | $\Phi_2$ | $\overline{\Phi_2}$ | $\Phi_3$ | $\overline{\Phi_3}$ | $\Phi_4$ | $\overline{\Phi_4}$ | $\Phi_5$ | $\overline{\Phi_5}$ | $\Phi_6$ | $\overline{\Phi_6}$ |
|---|---|---|---|---|---|---|---|---|---|---|---|
| 100 | 101 | 102 | 103 | 104 | 105 | 89 | 91 | 106 | 107 | 108 | 109 |

PHOTOTRANSISTOR OUTPUTS

Referring to FIG. 12, the collectors of phototransistor elements $L_{PT}$, $C_{PT}$, and $R_{PT}$ are supplied with voltage +VS, and emitter outputs thereof are carried on separate leads $39_L$, $39_C$ and $39_R$ to the counting and recording equipment to be described at a later point. The limiting amplifiers generally designated 56, 57 and 58 perform the function of generating square waveform signals from the photosensor outputs corresponding in duration to the intervals $T_{xL}$, $T_{xC}$ and $T_{xR}$ with a constant amplitude VDD. Each limiting amplifier comprises a functional amplifier element 84 with feedback acting as a buffer amplifier with a high input impedance, delivering its output to comparator amplifier 85 which embodies hysteresis restraint to proven oscillation about a level. Amplifier 86 converts the comparator output to the logic level and delivers the output as shown in trace 57 having a minimum value corresponding to −VS (ground level). The threshold level 55 is set by the tap point of series resistors $R_{13}$, $R_{14}$, the terminal of $R_{13}$ supplied by regulated + 15 volts.

TIMING SEQUENCE GENERATOR

Referring now to FIG. 13, the square wave outputs, trace 49, are fed to timing sequence generator block 62 which provides a series of six precursor time intervals $\Phi_1 - \Phi_6$ as depicted in FIG. 10. The operation may be understood by considering the generation of the quantity $\Phi_4$ as exemplary. The FLIP-FLOP 87 is provided with a pair of inputs, such that when input 88 is present an output $\Phi_4$ appears on line 89 while an input at 90 resets the unit. Output 91 represents the logic inverse, i.e. the complement of an output at 89.

An input at 88 is provided by AND GATE 92 whenever the complement of $\Phi_3$ derived from another section of the timing sequence generator is applied to input 93 and whenever the leading edge of a square wave representing the $T_{xC}$ transit interval is applied to input 94. The output of FLIP-FLOP 87 is inhibited whenever its input 90 receives an output from AND GATE 95. This condition is produced when the trailing edge of the pulse waveform 49 representing the $T_{xL}$ transit interval occurs at the input to amplifier 96 which feeds amplifier 97 the output of which is fed to the FLIP-FLOPS 98 and 99 in sequence, providing input to AND GATE 95. Accordingly, this portion of the timing sequence generator operates to generate precursor interval $\Phi_4$ having an occurrence time and duration in accordance with the following conditions:

a. the interval $\Phi_3$ has not terminated;
b. $\Phi_4$ starts when the leading edge of transit interval $T_{xC}$ occurs;
c. $\Phi_4$ terminates with the trailing edge of transit interval $T_{xL}$.

Each of the other precursor intervals and their complements are similarly generated, each portion being inter-dependent with the other processing sections of the TSG as shown for the above example. The respective outputs appear on lines as indicated below:

Referring to FIG. 17 the group of output signals designated $\Phi_1 - \Phi_6$ and their complements $\overline{\Phi_1} - \overline{\Phi_6}$ are supplied to the three groups of AND GATES 110 in the particular pair relations shown, and the AND GATE output of each group is fed to a single OR GATE 111, the output of each of which provides a signal, so that these jointly represent in three-bit vinary code, the numerical identification of the precursor interval. For example, the simultaneous appearances of $\Phi_1$ and $\Phi_6$ complement interval signals or their complements in AND GATES of the second and third sets provides a 1 output at 112 of the binary 2 unit and also at 113 in the binary 4 unit, so that the printer 80 is controlled to print the number 6 preceding the print-out of the interval corresponding to transits across $L_{PT}$ and $C_{PT}$.

COMBINATION OF NON-OVERLAPPING INTERVALS

As will be apparent also from inspection of the waveform 57 in FIG. 10, the odd-subscript precursor intervals $\Phi_1$, $\Phi_3$ and $\Phi_5$ are well separated in time from each other; similarly the even-subscript numbered precursor intervals $\Phi_2$, $\Phi_4$ and $\Phi_6$ cannot overlap each other. As will be seen from FIG. 9, none of the transit intervals $T_{xL}$, $T_{xC}$ or $T_{xR}$ can have a duration concurrent with any portion of the otehr of these intervals. In FIG. 14 the complement outputs on paths 101, 105 and 107 are therefore combined in OR GATE 114 to provide on output line 115 the odd-subscript waveforms $\Phi_1$, $\Phi_3$ and $\Phi_5$; the outputs on lines 103, 91 and 109 are combined in OR GATE 116 to provide the even subscript waveforms $\Phi_2$, $\Phi_4$ and $\Phi_6$ on line 117; and in FIG. 15 the outputs of limiting amplifiers 56, 57 58 are combined in OR GATE 118 to provide the group of waveforms on line 119 which are complements of $T_{xL}$, $T_{xC}$ and $T_{xR}$ respectively. These trains are supplied as inputs to the 'Frequency control and Generation of Counts' next to be described.

FREQUENCY CONTROL AND GENERATION OF COUNTS

Referring again to FIG. 10, the precursor intervals $\Phi_1$, — $\Phi_6$ are depicted as having hatched sections immediately following their leading edges and immediately preceding their trailing edges, having durations corresponding to a particular $T_x$ interval; for example, $\Phi_2$ includes a $T_{xR}$ interval at each end. The counting scheme employed in FIG. 16 is the provision of a count of pulses in a first train having a duration equal to the sum of the particular $T_x$ transit intervals combined in any $\Phi_x$ interval, the recurrence rate of the pulses being the frequency N, combined with a count of pulses in a second train having a duration equal to the remainder of the $\Phi_x$ interval, the recurrence rate of the second train being the frequency 2N. The sum of the counts is therefore a measure of the interval corresponding to the instants of transits of the light beam across the electrical mid-points of the pair of phototransistors crossed in sequence, or to the instants of transits of the light beam across the electrical mid-points of the same phototransistor during the out and return swings. When the frequency N is 500 Hertz and 2N is 1000 Hertz, precisely controlled by subdividing a crystal-controlled high frequency source, the count is precisely the number of milliseconds of elapsed time, and derives the numerical value of timing intervals $T_1$, $T_2$, $T_3$, $T_4$, $T_5$ and $T_6$ from the respective precursor intervals dealt with.

The velocities of the light beam while making transits across the phototransistors are found to be generally constant during any set of consecutive swings, so that the durations of the transit intervals closely compare with one another. The assumption may be safely made that:

$$(T_{x_C} + T_{x_R})/2 = (T_{x_C} + T_{x_L})/2 = (T_{x_R} + T_{x_R})/2 = (T_{x_L} + T_{x_L})/2 \quad (29)$$

It is necessary to provide a pair of counters which are designated 120A and 120B since it will be clear that the odd subscript precursor intervals cannot be handled together with the overlapping even subscript intervals. In the arrangement next to be described, the two counters perform interleaved counting operations and deliver accumulated outputs to the printing apparatus.

The signals on line 119 control the gating intervals during which the AND GATES 120, 121, 122 and OR GATE 123 accept half-frequency train N on line 124. Whenever no signal representing $T_{xL}$, $T_{xC}$ or $T_{xR}$ is present on line 119, frequency 2N one line 125 is gated through to the counters during the durations of the precursor intervals $\Phi_1$ — $\Phi_6$. The particular mode of generating counts will be described in the next following matter.

At the leading edge of $\Phi_1$ or $\Phi_3$ or $\Phi_5$ the FLIP-FLOPS 126 and 127 as well as GATE 128 produce an output pulse which resets counter 240A to zero. Then the selected frequency pulse train 2N or N, depending on whether or not a signal exists at 119, is gated by OR GATE 129 and delivered to line 130 to counter 120A. The pulses in the train are summed in counter 120A for the duration of any signals appearing on line 131.

At the trailing edge of a signal on line 131, FLIP FLOPS 126, 137, as well as GATE 132 generate two outputs: one is an instruction which causes initiation of a printing cycle; at the same instant GATES 133, 139 which constitute a RESET/SET FLIP FLOP, select the correct data path in the printer/multiplexer unit 110. Similar actions occur for the two other members of the group of signals on line 131 serving counter 120A.

The signal group on line 135 is similarly treated as was the signal group on line 131, exceptv that the pulse train sum is accumulated in counter 120B and after the counting operation is finished, the other data path is selected to the printer.

COUNTERS AND MULTIPLEXER

Counters 120A and 120B are 6-digit BCD count-up counter units. These two counters feed a 6-digit multiplexer in FIG. 18 as noted above, the appropriate counter output being routed to the printer by the multiplexer which responds to the RESET/SET FLIP-FLOP comprised of GATES 133, 134. Thus, the printer 80 is commanded to print the value obtained during the immediately-preceding time interval. While printing, the unit is accumulating the next sequential time interval. Such printer may be a unit produced by SEIKO ELECTRONICS, Model EP-101. A suitable interface for the printer is included with the instrument to accomodate BCD data delivered from the multiplexer.

REDUCTION OF DATA DRIFT OBSERVED FROM RIGHT AND LEFT SWINGS

When the suspended gyroscope with spinning rotor is released to swing freely, and a number of swing excursions are recorded to each side, it will usually be found that the half-period intervals $P_{L/2}$, $P_{R/2}$ change as the observations proceed. The term "drift" will be used in this description for the decrease or increase in half-period swing times over a number of swings. The phenomenon is manifested in the unequal or even opposite trends of the extreme excursion times relative to a reference center corresponding with the center of the $C_{PT}$ transit interval ($T_{xC}$). When the mean times are taken from each pair of adjacent opposite swings, the consecutive mean times will be observed to wander with respect to the center phototransistor transit midpoint, and the change will always be in the same direction, being toward the cold equilibrium position when the non-spinning swing is observed following a long interval of spinning swing observations.

It has also been consistently observed that the drift of the mean equilibrium position of the spinning swinging gyroscope is in the direction toward a relatively steady warm equilibrium position; if the motor has been allowed to run for a sufficiently long time prior to making a set of observations, the warm equilibrium state will already have been reached, so that such drift may not be apparent in the spinning swings.

The phenomenon of drift appears to be mainly due to changes in the zero torsion torque equilibrium point B of the filar band, although the effect of heat changes on other parts of the gyroscope, such as bearing dimensional changes, cannot be excluded. The rectification of the half-period swing time intervals can only be made by correctly evaluating the magnitudes in all swing observations, of the drift component. Such rectification can be reliably made only when a sufficient number of swings left and right have been observed under conditions such that the observations are credible. These conditions are discussed herein below.

SPIN VARIATIONS

Gyroscopes having induction motor rotors are subject to speed variations due to power supply variations, although under the conditions of careful determinations the spin velocity decrease will be slight and reliably uniform over the time span of each observation set.

One very important phenomenon hitherto overlooked in gyrocompass determinations is the effect of bearing loading which prevents the rotor from attaining its ultimate spin velocity. The torque available to accelerate the rotor at any lower spin velocity $\omega_{sp}$ toward the ultimate rotational speed $\omega_{max}$ is the torque available after all loads have been overcome.

The assumption was always made in the prior art that if a sufficiently long run-up time was allowed, the caged gyroscope rotor would surely have attained its ultimate or $\omega_{max}$ spin velocity, and that on release to swing the values of J and A (which include $\omega_{sp}$ in their defining relations) would be essentially constant. It has now been found, surprisingly, that this is quite incorrect; precise timing establishes that the gyroscope suddenly accelerates at a small but significant rate when released to swing freely and over an interval of time thereafter builds up rotational speed to approach $\omega_{max}$. The reason for the speed change is that the bearing loading is suddenly decreased, when the torque moment corresponding to the angle between the spin axis of the caged gyroscope rotor and the meridianal plane falls to zero as the gyroscope spin axis aligns in the Meridian. If the gyroscope has been spinning several degrees off North during the run-up interval the torque moment tending to precess the spin axis toward North is sufficient to create an audible whining, signifying that axle pressure on the restraining bearings is greater than when the gyroscope is swinging freely. Since only a very small torque component is available for accelerating toward $\omega_{max}$ after releasing the spin velocity is likely to be slowly changing for the entire first half-swing, and some acceleration may still be occurring during the second half-swing.

It is therefore deemed prudent and necessary to omit from consideration any time intervals measured during the first two half-swings, since their half-period times are likely to be so seriously deformed as to be unsuitable for rectification of drift and meridianal deviations.

PROCEDURE FOR OBSERVING GYROCOMPASS

The measurements of time intervals can be regarded as valid for making determinations of North only when the manner of taking these measurements duly recognizes the error sources discussed in the foregoing and provides observations capable of rectification.

The sequence itemized below should be carefully followed:

1. The gyroscope with all illuminating devices on is run for a warm-up time sufficient to attain heat equilibrium of all components within the exterior casing; if any sharp change in wattage dissipated in the equipment occurs for any reason, heat equilibrium cannot be relied on for at least 5 minutes thereafter.

2. While the instrument is warming up, a sequence of approximate alignments to the Meridian is carried out. As an initial setting, magnetic compass and map information may be relied on to enable the operator to set his initial orientation as close to the Meridian as possible. To obtain a preliminary alignment by followed swing, after the spin velocity is near its maximum, the rotor is released to swing from the initial North approximation, and the indicator beam is followed by manipulation of the theodolite to closely maintain the beam on the gyrocompass scale zero, measuring the H.C. angles at the extreme right and left excursions. The midposition is calculated, and the theodolite horizontal circle is set to this position. The beam is observed as it approaches scale zero, and the rotor is caged in that position. The rotor is again released to swing, and the electronic timing/recording apparatus is put into automatic operation, to observe the half-periods, after which the rotor is caged. If for example the half-period on the left side is recorded as 220 seconds while that on the right side is 190 seconds it signifies that the equilibrium direction lies to the left of scale zero, the angle $a$ (FIG. 5) being roughly estimated as proportional to the 15 seconds of time difference of each swing from the half-period mean. Because in the construction of the particular instrument shown a clockwise rotation of the upper end of the filar band 11 as viewed from the top causes the excess swing left, the theodolite and exterior housing 14 of the gyrocompass are adjusted by an anti-clockwise rotation, in the proportion of approximately 1.5 minutes of arc for each second of time difference from the mean. For example in this case the correction would be about 22 minutes of arc, to leave a relatively small $a$. The rotor is then caged.

3. Sightings are taken on the reference object RO following the fine alignment in (2) while the warm-up period is in progress.

4. The gyroscope is released at the end of the warm-up period to swing through at least four half-swings to each side while the time interval data are automatically recorded and intervals identified;

5. The swinging gyroscope is arrested while spinning when crossing the center phototransistor, i.e. at the moment of the print-out of the $T_6$ interval;

6. The motor is de-energised and braking applied to bring the rotor spin velocity to zero, at a safe rate, generally greater than one minute;

7. The suspended mass is immediately released for non-spinning (pendulous) swing when rotation has stopped, and at least two pairs or three pairs of half-swings observed;

8. For first-order accuracy six to eight sets of observations are carried out, preferably at two different times of the day.

RECTIFICATION — CALCULATION MODEL

The data observed in the foregoing steps (4) and (7) is utilised according to the invention in a computational model with the data of FIG. 19 as an illustration of the determination of Astronomic North. The procedure involves converting the left and right swing times — which are half-periods — to the form of the relation of Simple Harmonic Motion:

to the relations of Table A below, being numbered, for swings to the left, $Aa$, $Ab$, $Ac$, $Ad$, $Ae$ . . . . , or for swings to the right, $Ba$, $Bb$, $Bc$, $Bd$, . . . . commencing with the swing nearest to the braking instant, while the non-spinning swing times are coded, for left swings, $a_1$, $a_2$, $a_3$. . . . and for right swings $b_1$, $b_2$, $b_3$. . . . , the subscript progressing in the same sense as the progression of swings.

TABLE A

Magnitude of rates of drift

| | LEFT SIDE | | RIGHT SIDE | |
|---|---|---|---|---|
| No. of swings considered "$n$" | spin drift rate $r_A$ | non-spin drift rate $r_a$ | spin drift rate $r_B$ | non-spin drift rate $r_b$ |
| two | $(A_a - A_b)/2$ | $(a_1 - a_2)/2$ | $(B_a - Bb)/2$ | $(b_1 - b_2)$ |
| three | $(A_a - A_c)/2$ | $(a_1 - a_3)/2$ | $(B_a - B_c)/2$ | $(b_1 - b_3)/2$ |
| four | $(A_a + A_b + A_c - A_d)/4$ | $(a_1 + a_2 - a_3 - a_4)/4$ | $(B_a + B_b - B_c - B_d)/4$ | $(b_1 + b_2 - b_3 - b_4)/4$ |
| five | $(A_a + A_b - A_d - A_e)/6$ | $(a_1 + a_2 - a_4 - a_5)/6$ | $(B_a + B_b - B_d - B_e)/6$ | $(b_1 + b_2 - b_4 - b_5)/6$ |
| six | $(Aa + A_b + A_c - A_d - A_e - A_f)/9$ | | | etc. |

$$x_q = \psi \sin \omega_q . t \qquad (30)$$

where:

$t$ is a time interval from the equilibrium position of the swing;

$\omega_q$ is the apparent angular velocity having the calculated value $$2\pi/P$$

$x_q$ is the distance of the beam at time $t$, measured from the equilibrium point; and $\psi$ is an amplitude computable from the calculated $\omega_q$ and two time intervals included in the period P.

Two principles are complied with in effecting the rectification of data:

a. equal weights are applied to all observations excluding the first pair of opposite swings;

b. the drift of the mean period time with respect to a timing reference is determined as a rate, and all observations are rectified by an adjustment computed in proportion to this rate for a time interval measured from the instant when rotor spin was braked.

Because the measured half-period times of swings left and right have different rates of change with time, they are processed separately, for spinning swing and for non-spinning swing, i.e. four rates are derived for each observation set.

During the swinging over a number of complete periods there will occur a generally linear decrement of amplitude which results in an increase of transit time intervals as measured between two adjacent photosensors, and in a decrement of the time intervals which are measured for the out and return crossings of an outer photosensor. The angular velocity of the swing being assumed constant, the observed absolute velocity decrease may be inferred to be due to a Decreasing SMH rather than a true SMH as set forth by equation (30). The rate of decrease has been found to be both positive or negative, due to both decrement of amplitude and effects of drift, and different for different portions of the swings.

The derivation of the drift rates is as follows:
The measured swing times are coded for use according It has been consistently observed that the rate of change of the swing times attributable to both normal friction decrement and drift, during a set of observations spanning perhaps 40 minutes of time, is essentially linear, but that the rates of change of swings on the right and left sides may be different. Inspection of the numerical values entered in FIG. 19 shows that the left side exhibits the smaller spinning swing times, as measured with respect to the center photosensor element, while the non-spinning swings on the right side are the lesser.

As the end of a spinning swing set of observations is separated in time from a subsequent non-spinning set only by the braking interval, which is less than a minute in length usually, but the beginning of a spinning-swing set is separated in time from the end of the revious non-spinning swing set — assuming the first swing usually ignored — by a quite long time, generally about 11 minutes, it is advisable to execute the reduction toward a common timing point, which should be as close as feasible to a spinning swing set, to avoid occurrence of undetectable and anomalous period changes. For the reasons just given it is preferred to reduce the spinning observations backward in time to the instant of the end of the braking interval, and to adjust the non-spinning observations ahead in time toward the same instant. Only in this way can the temperature and band hysteresis, etc. be regarded as having a common value for both spinning and non-spinning operation, at a specific instant, and the anomalous components of swing times remote from the common timing reference computed.

The elapsed times during spinning swing have to include the time interval to the end of the braking operation, since the non-spinning swing commences practically at the moment spinning stops.

Once the rates of change $(r_A, r_B)$ for spinning swings, and the rates of change $(R_a, R_b)$ for non-spinning swings have been determined the time interval of the angular offset angle S (FIG. 5) between the traversals of the timing center of sensor $C_{PT}$ and the equilibrium direction C by the gyroscope swing axis may be found by establishing first the corrections $S_A$ and $S_B$ for the rectification of the left and right spinning swing times, the corrections $s_a$ and $s_b$ for the rectification of swing times left and right for non-spinning states, and combining these corrections appropriately as follows:

For the left side, $$S_A = [(2n-1)/4 + \mu_b].r_A + A_{arithmetic\ mean} \quad (31)$$

For the right side, $$S_B = [(2N+1)/4 + 4_b].r_B + B_{arithmetic\ mean} \quad (32)$$

where $\mu_b$ is the interval of braking, e.g. 0.17 of average period for the particular instrument as determined from several sets.

$n$ is the number of swings considered on a side.

The quantities bearing subscripts$_{(arithmetic\ mean)}$ are as for TABLE A, the averaged half-period times for the respective sides.

Because in the non-spinning mode $\mu_b = 0$ and three swings to each side will be taken as sufficient, the formulae simplify to:

$$s_a = (1.25\ r_a + a_{arithmetic\ mean}) \quad (33)$$

$$s_b = (1.75\ r_b + b_{arithemtic\ mean}) \quad (34)$$

The time intervals up to this point in the description have been referred to the electrical apparent center of $C_{PT}$. To utilise equation (30) for deriving the parameters of the SMH, a timing error quantity (error of alignment setting) will be found relating the equilibrium point of the SMH to the observed sets as follows:

$$T_c = (S_A + S_B)/4 \text{ for spinning swing} \quad (35)$$

$$t_c = (s_A + s_b)/4 \text{ for non-spinning swing} \quad (36)$$

wherein $T_c$ and $t_c$ are expressed in units which require to be adjusted to relative proportions of the spacing of a pair of photosensors.

The parameters of SMH to which the rectified period times $P_c$, $P_z$ and the alignment setting errors $T_c$ and $t_c$ relate are found from the rectified time intervals of beam transits across the left and right photosensors by a procedure analagous to that empoyed in the foregoing. The drift corrections for sets observed with spinning and non-spinning rotor states are calculated as in TABLE A and the combinations are performed as in relations (31), (32) yielding a pair of intervals designated $T_{Li}$ and $T_{Ri}$. It must be noted that since the recorded time intervals $T_4$ and $T_6$ represent the quantity Li, and the intervals T1, T3 represent the quantity Ri, it is necessary in establishing rates to use a single interval, which is the mean of a pair of measured time intervals such that $$T_L = T_4 + T_6/2 \quad (37)$$

and $$T_R = T_1 + T_3/2 \quad (38)$$

ADJUSTMENTS FOR SENSOR RELATIVE POSITIONS

Although the positions of adjacent pairs of phototransistors may appear to be at equidistant spacings, as gauged from their external surfaces, their electrical response center-to-center distances may differ by many microns for adjacent pairs, and the center of the group may be angularly offset from the scale zero of the gyrocompass indicator beam. The actual accuracy of levelment in the Meridian plane contributes to uncertainty of angular relations.

A ratio Q is therefore established, assuming that the center-to-center distance between $C_{PT}$ and $R_{PT}$ is one unit of distance (in the sense that 'distance' represents angular displacement about the swing axis 12). The center-to-center distance between $C_{PT}$ and $L_{PT}$ is therefore:

$$L_i/R_i = Q \quad (39)$$

Employing the solution for $\omega_q$ as in (30), $$Q = (\sin \omega_q.T_o - \sin \omega_q.t_{Li})/(\sin \omega_q.t_{Ri} - \sin \omega_q.T_c) \quad (40)$$

The amplitude $\psi$ of a swing is then:

$$\psi i = 1 + Q/\sin \omega_q.{}^t{}_L i - \sin \omega_q.t_{Ri} \quad (41)$$

The angular difference between $C_{PT}$ and equilibrium direction C, designated S is derived from $T_c$ as found by (35) while a corresponding difference $s$ between $C_{PT}$ and direction B is representable by $^tc$, found by (36). Hence:

$$S = \psi_c . \sin \omega_o T_c \quad (42)$$

(for an observation set with spinning swing)

$$s = \psi_z.\sin \omega\omega_q t_c \quad (43)$$

(for an observation set with non-spinning swing).

The magnitude of S is expressed as distance in units of the $C_{PT} - R_{PT}$ interval, between the timing center of sensor $C_{PT}$ and spinning equilibrium direction C, and the magnitude of $s$ is expressed as distance in the same units, between the timing center of sensor $C_{PT}$ and non-spinning equilibrium direction, i.e. band-torque zero.

In carrying out sets of observations on a station, it is necessary to slightly offset the HC by equal angular displacements relative to scale zero of the theodolite/gyrocompass frame, thus shifting the angular position of the timing reference center alternately West and East of the assumed North (instrument scale zero) for successive pairs of observation sets. A suitable angle is two minutes of arc. This quantity is a small fraction of the $L_i$ and $R_i$ distances, and suffices to shift their ratios, permitting calculations of numerical values for pairs of $\alpha_d$ quantities as will be set out hereinafter.

The values of $\alpha_d$ for each set may now be found from (3), utilising the S and s quantities computed from (42) and (43) and the quantity k found from (25) which values represent the differences between the direction North and the HC settings of the observations, expressed in units of the $C_{PT} - R_{PT}$ interval.

The direction North on the horizontal circle is indicated by applying the angular correction $\theta$ to the HC setting for the associated pair of observation sets:

$$\theta = W.\alpha_d \quad (44)$$

where W is a proportionality factor denoting the angular value of a unit distance of the phototransistor interval expressed in seconds of arc, which factor can be determined only from a pair of observations sets with different HC settings as will next be described.

As will be clear from TABLE B, an $\alpha_d$ is computed for each set of observations, the setting of the gyrocompass/theodolite frame alternately being 2' East and 2' West of the assumed North. The summing of $\alpha_d$ quantities for adjacent pair of observation sets provides a pairs number directly correlating the angular shift with the factor.

$$\alpha_N = H.C._{(Azimuth)} + \theta_{mean} \quad (46)$$

It must be noted that variations in computed $\alpha_N$ may be related to dislevelments occurring during a set, such instability of the instrument support whether by reason of dimensional changes with temperature or ground shifts, hence the correlation with associated R.O. readings establishes a more precise determination of North.

Since a reference object reading (RO) will have been recorded with each set of observations on the station, the azimuth angles of relation (2) may be expressed in the form:

$$A_{zi} = R\ O_i + E + \alpha_N + \text{collimation} \quad (47)$$

where E is the instrument constant as previously defined.

CALCULATIONS FOR A STATION

Tables I and II show measured time intervals recorded for one set of spinning swings followed after braking stop of the gyroscope rotor by the non-spinning swings, as shown in FIG. 19, which show half-period values, drift trends to the common time basis at the

TABLE B

| SETS | 2,3 | 4,5 | 6,7 | 8,9 | 10,11 | 12,13 |
|---|---|---|---|---|---|---|
| $\alpha_d$ | $\alpha_{d1}$ | $\alpha_{d2}$ | $\alpha_{d3}$ | $\alpha_{d4}$ | $\alpha_{d5}$ | $\alpha_{d6}$ |
| $\Delta$ H C | 240'' | 240'' | 240'' | 240'' | 240'' | 240'' |
| $\Delta\alpha_d$ | | $\alpha_{d1}-\alpha_{d2}$ | $\alpha_{d2}-\alpha_{d3}$ | $\alpha_{d3}-\alpha_{d4}$ | $\alpha_{d4}-\alpha_{d5}$ | $\alpha_{d5}-\alpha_{d6}$ |
| $\omega = \Delta HC/\Delta\alpha_d$ | $\omega_1$ | $\omega_2$ | $\omega_3$ | $\omega_4$ | $\omega_5$ | |
| $\theta'=\omega\alpha_d$ | $\omega_1\alpha_{d1}$ | $\omega_1\alpha_{d2}$ | $\omega_2\alpha_{d3}$ | $\omega_3\alpha_{d4}$ | $\omega_4\alpha_{d5}$ | |
| $\theta''=\omega\alpha_d$ | | $\omega_2\alpha_{d2}$ | $\omega_3\alpha_{d3}$ | $\omega_4\alpha_{d4}$ | $\omega_5\alpha_{d5}$ | $\omega_5\alpha_{d6}$ |
| $\theta_{mean}$ | $(\omega_1+\omega_2/2)\alpha_{d1}$ | $(\omega_1+\omega_2/2)\alpha_{d2}$ | $(\omega_2+\omega_3/2)\alpha_{d3}$ | $(\omega_3+\omega_4/2)\alpha_{d4}$ | $(\omega_4+\omega_5/2)\alpha_{d5}$ | $\omega_5\alpha_{d6}$ |
| $HC_{Azim.}$ | 0°-02'-00'' | 359-58-00 | 0°-02'-00'' | 359-58-00 | 0°-02'-00 | 359-58-00 |

SCALE ZERO SETTING WITHIN $\mp$ 1° of NORTH

Thus, with a first pair of observation sets observed on an East-of-North HC reading of 2 minutes of arc (for which pair an apparent azimuth of the Reference Object sighting is also recorded) yielding $\alpha_{d_1}$, and a shift for the following pair of observation sets to an HC reading of 2 minutes of West of North, yielding $\alpha_{d_2}$, a $W_1$ factor is derived:

$$W_1 = \Delta HC/(\alpha_{d_1} - (-\alpha_{d_2})) \quad (45)$$

As many values of W are computed as there are consecutive groups of pairs of observation sets on opposite sides meridian. the meridan.

The solution for $\theta$ according to (44) may now be completed. It will be evident that with the exception of the first and last sets, all determinations define two distinct $\theta$ values, $\theta'$ and $\theta''$, bearing positive or negative signs corresponding to the azimuthal sense. The most probable value of $\theta_{mean}$ referring to a particular $\alpha_d$ value is found from the mean of the two W quantities above it in the table. The values for the first and last $\theta_{mean}$ may be obtained by the calculation indicated with a lesser probable accuracy.

The correction $\alpha_N$ to the horizontal circle zero to obtain the direction of North expressed as an azimuth, i.e. HC reading, referred to instrument scale zero, will be commencement of non-spinning swing, as well as rectified half-period calculations for each side in each mode.

The sequence in time of the intervals in both Tables proceeds up the page so that the uppermost recorded ($T_6$) time interval was the last of the series; however, it must be remembered that the $T_6$ spinning interval preceded in time the commencment of non-spinning swing by about 75 seconds, the length of the braking interval and that the lowermost recorded interval of non-spinning swings ($T_1$) commenced a half-period (about 31 seconds) after the commencement of swinging.

Considering first the drift trends in FIG. 19, the left half-periods of spinning swing are smaller than those on the right side (below the time axis), and show a drift toward the common time reference, while very little drift is apparent for the right swings. The non-spinning right swings have the shorter half-period values, and show a drift trend increasing away from the common time reference while the left swings have a strong drift trend, decreasing away from the common time reference. It should here be noted that the time scale of the non-spinning swing has been scaled up in proporation to the spinning swing elongations depicted.

In rectifying the non-spinning intervals $L_i$, $R_i$, the rate of decrement is based on the differences, for a set of three half periods, of the first and third half-periods. The nearest interval to the release instant considered was $T_4$, $T_6$ having values respectively of 4.273 and 4.438; the mean $t_{Li}$ interval is therefore 4.356. Similarly, the last left swing, furthest in time from the braking stop, has $T_4$ and $T_6$ times of 4.380 and 4.580; their mean is found as 4.480.

The mean $t_{Ri}$ times are found similarly.

The rate of decrement of the two $t_{Li}$ means is based on their difference: $4.356 - 4.480/2 = -0.062$.

The correction formula is based on $n = 4$, hence $$s_a = 2.25 \times 0.062 = -0.1395.$$

The correction of the mean for $t_R$ is made for the side closer to the reference axis, $n$ being 3''

$$s_b = 1.75 \times 0.063 = +0.1102.$$

The corrections are combined with the arithmetic means of the $t_{Li}$, $t_{Ri}$ to yield:

$$T_L = 4.2795$$

$$T_R = 4.4781.$$

The half-periods left and right show the half-differences +0.008 and −0.007 respectively; the right one is multiplied by 1.75 for $s_a$ and the left one by 2.25 for $s_b$. The amounts adjusted with the arithmetic mean half-periods provide a left swing time of 30.3083 seconds and a right swing time of 30.1497 seconds, with a period equal to their sum:

$$P_z = 60.458 \text{ seconds.}$$

The mean half-period is therefore 30.229, and the time by which the left and right swing times differ from the mean half-period establishes:

$$2^t{}_C = -0.0793$$

Hence $t_c = -0.0396$.

The rectification for spinning swing recognizes that there are five half-periods on the left side and four on the right side in choosing the rate formula in TABLE A. The time interval following spinning swing until the rotor has braked to a stop is taken into account by using a factor previously found, $b = 0.17$. The rates of decrement are found for the $t_{Li}$ and $t_{Ri}$ means as described above, and the calculation of spinning period and $T_c$ proceeds similarly.

In TABLE III the calculations of apparent angular velocities and interval distances expressed as quasi-angles are presented.

In TABLE IV the final adjustments according to the procedures outlined are dealt with for a number of sets of observations recorded on the station, of which the set marked 4–5 correspond to the tabular data of TABLES I and II, shown by FIG. 19. TABLE V shows $k$ calculations.

All of the anomalous effects which the physical and mathematical models presented hereinabove have dealt with are either eliminated by the rectification procedures or at least decreased to quite insignificant amounts. Consequently only the Simple Harmonic Motion remains in the final results, free from deforming effects, so that the only errors present are those attributable to normal observation errors, such as intersection error, and coincidence error in the horizontal circle reading. All other normal human observation errors are eliminated by the operation of the automatic electronic recording system.

The trigonometric relationships dealt with by relations (30), (37) and (40) through (43) may best be grasped visually by referring to FIGS. 20–23 inclusive. In FIGS. 20 and 21 a Cartesian axis system is shown in which the axes have been rotated 90° with abscissa axis aligned North-South. The filar axis 12 is shown in plan view displaced from the photosensor group in greatly enlarged scale representation. The rectified swing displacement data is depicted as simple Harmonic Motion of points at the ends of a pair of phantom beams represented by the radius lengths $\psi_c$ and $\psi_z$ rotating with respective angular velocities $\omega_{qc}$ and $\omega_{qz}$ about apparent centers 12', 12'' on the X—X axes. The sense of the rotations, i.e. whether clockwise or anticlockwise, depends on the direction of the first swing of the rotor axis on release of the gyrocompass. Such phantom beams are depicted as alternately sweeping sensor group $L_{PT}$, $C_{PT}$ and $R_{PT}$ and mirror-image group $L'_{PT}$, $C'_{PT}$, $R'_{PT}$.

The diagrams will also make clear that it is unnecessary to obtain any direct observation of the extreme excursions of swings. The simulation of any observation set would rotate the phantom beam through several complete revolutions. The angular displacements of the phantom beams are measured from the X—X axis, the sine intercepts on the ordinate Y—Y axis in this axis configuration being positive in the first and second quadrants — representing swings East of the Meridian — and negative in the third and fourth quadrants.

Whether or not the distances between the electrical response centers of the group of sensors is known, the accurate timing of the significant transit intervals enables precise identification, in period time, of the instant when the phantom beam lies along the abscissa, and enables computation of the ratios of phantom beam radius and of the $L_{PT}$–$C_{PT}$ interval to the $C_{PT}$–$R_{PT}$ until distance.

While FIGS. 20 and 21 have been diagrammed to show the sequence of time intervals recorded in any observation of a set, the diagrams also serve to illustrate the rectified Simple Harmonic Motion calculated for the base reference time, i.e. the instant of rotor release for non-spinning swing.

Referring further to FIGS. 22, 23, the phantom beam parameters of motion are depicted for a sweep of $\pi$ radians in a scale considerably enlarged from FIGS. 20, 21.

Intercept distances along the ordinate axis are shown for projections of beam transits through the response centers of the photosensors for the rectified sub-period times and alignment error intervals calculated for these events from an observation set.

The rectified data shown is that established in TABLES I, II and III.

Figure 24B:
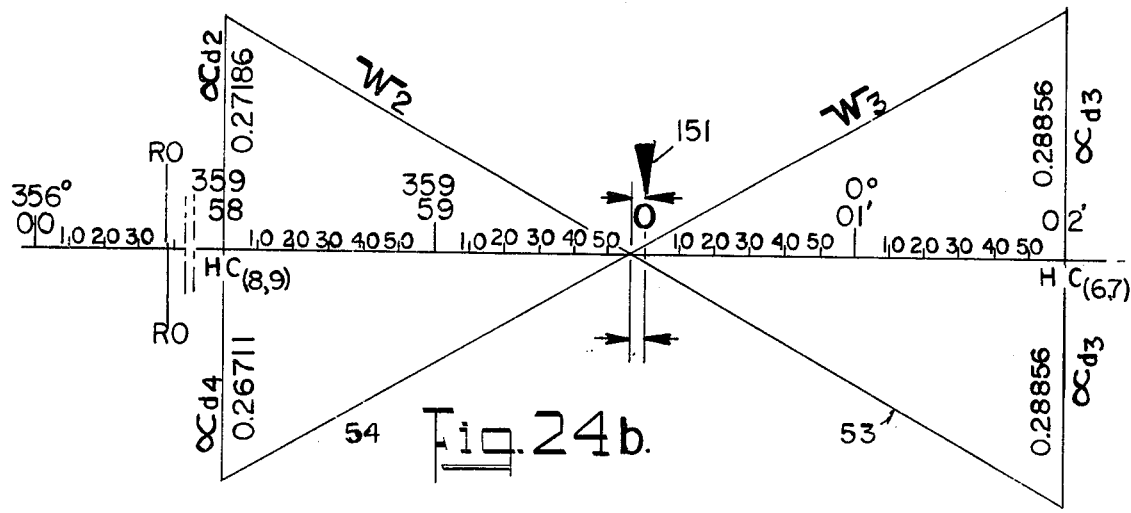
Figure 24C:
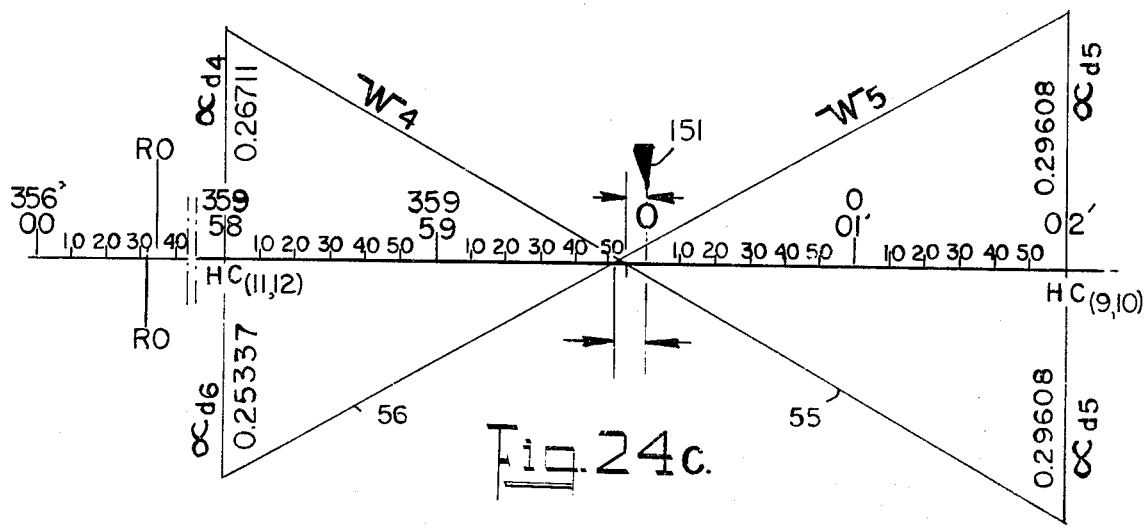

Referring to FIGS. 24 $a$, $b$ and $c$, the indicia of Horizontal Circle Scales 150 represent angular subdivisions readable in seconds of arc, of which the scale zero indicia represented by frame-fixed pointer 151 and graduations through a range of ± 2 minutes to each side are in vertical alignment in the set of figures.

Calculated values of $\alpha_d$ are set off in a suitable scale as ordinate quantities erected from the respective HC settings of each pair of observations, positive $\alpha_d$ offsets extending oppositely to negative $\alpha_d$ offsets. It will be noted that no set 1 appears, the data being discarded for purposes of verifying the fully-operational state of the automatic recording system. Observation sets No.

2 (spinning rotor) and No. 3 (non-spinning rotor) were taken with an HC reading of 0°-02'-00" yielding a positive $\alpha_{d1}$, and sets No. 4, No. 5 were taken with an HC reading of 359°-58'-00" yielding a negative $\alpha_{d2}$.

Succeeding sets were alternated in sequence.

Straight factor lines 52, 53, 54, 55 and 56 passed through the $\alpha_d$ offsets from a scale, respectively represent the proportionality factors $\omega_1 - W_6$ computed for pairs of sets on opposite sides of the Meridian, and will be seen to intersect the horizontal scales at small angular values on the West side of the scale zero, defining $\alpha_N$ intervals.

It will be evident that the total ordinate intercept spanned by any "factor" line represents the sum of two consecutive $\alpha_d$ quantities, and that the intersection of the factor line with the Horizontal Circle Scale as Abscissa effectively solves graphically for correction $\theta$. i.e. provides a solution of the Azimuth of North with respect to scale zero. The extended horizontal scale includes a rane of indicia representing the Reference Object azimuth observation RO recorded for each pair of sets referred to instrument scale zero. Accordingly, the accurate determination of North includes reference to the RO readings, with adjustment for collimation, and for a constant instrument error E, enabling correction to be made for any inconstancy of azimuthal position of the instrument tripod or support.

TABLE I

SPINNING SWING TIME CALCULATION — SET NO. 4

| INTERVALS | | $+^tL$ | $-^tR$ | L | $^-R$ |
|---|---|---|---|---|---|
| $T_6$ | 032.511 | | | | |
| $T_5$ | 139.267 | | −32.022 | | −203.310 |
| $T_4$ | 031.532 | | | | |
| $T_3$ | 030.542 | | | | |
| $T_2$ | 145.467 | 30.432 | | +206.330 | |
| $T_1$ | 030.321 | | | | |
| $T_6$ | 032.437 | | | | |
| $T_5$ | 139.452 | | −31.938 | | −203.329 |
| $T_4$ | 031.004 | | | | |
| $T_3$ | 030.486 | | | | |
| $T_2$ | 145.485 | 30.363 | | +206.214 | |
| $T_1$ | 030.240 | | | | |
| $T_6$ | 032.427 | | | | |
| $T_5$ | 139.585 | | | | |
| $T_4$ | 031.392 | | −31.910 | | −203.404 |
| $T_3$ | 030.440 | | | | |
| $T_2$ | 145.551 | | | | |
| $T_1$ | 030.254 | 30.347 | | +206.245 | |
| $T_6$ | 030.327 | | | | |
| $T_5$ | 139.701 | | | | |
| $T_4$ | 031.430 | | −31.878 | | −203.458 |
| $T_3$ | 030.209 | | | | |
| $T_2$ | 145.601 | | | | |
| $T_1$ | 030.565 | 30.387 | | +206.375 | |
| "r" rate correction | | 0.018875 | −9.0575 | −0.02075 | +0.06488 |
| to mean | | 0.0362 | −0.0817 | −0.0398 | +0.0921 |
| mean | | 30.3822 | −31.937 | +206.291 | −203.3752 |
| $T_L$: | | 30.4184 | $T_R$: −32.0187 | $S_A$: +206.2512 | $S_B$: −203.2832 |
| $^tL_t$: | | +29.6764 | $^tR_t$: −32.7607 | $T_c = -0.742$ seconds. | |
| | | | $P_C$ PERIOD: 409.5344 seconds | | |

TABLE II

NON-SPINNING SWING TIME CALCULATIONS — SET NO. 5

| INTERVALS | | $+^tL$ | $-^tR$ | L | R |
|---|---|---|---|---|---|
| $T_6$ | 004.580 | | | | |
| $T_5$ | 021.338 | 4.480 | | +30.298 | |
| $T_4$ | 004.380 | | | | |
| $T_3$ | 004.808 | | | | |
| $T_2$ | 020.854 | | −4.652 | | −30.157 |
| $T_1$ | 004.495 | | | | |
| $T_6$ | 004.516 | | | | |
| $T_5$ | 021.471 | 4.421 | | +30.313 | |
| $T_4$ | 004.326 | | | | |
| $T_3$ | 004.729 | | | | |
| $T_2$ | 020.975 | | −4.587 | | −30.149 |
| $T_1$ | 004.445 | | | | |
| $T_6$ | 004.438 | | | | |
| $T_5$ | 021.603 | 4.356 | | +30.314 | |
| $T_4$ | 004.273 | | | | |
| $T_3$ | 004.660 | | | | |
| $T_2$ | 021.091 | | −4.526 | | −30.143 |
| $T_1$ | 004.392 | | | | |
| "r" rate correction | | −0.062 | +0.063 | +0.008 | +0.007 |
| to mean | | −0.1395 | +0.1102 | +0.018 | +0.0122 |
| Arithmetic mean | | 4.419 | −4.5883 | +30.3083 | −30.1497 |
| $T_L$: | | 4.2795 | $T_R$ −4.4781 | $s_a$: +30.2903 | $s_b$: −30.1375 |
| $^tL_t$: | | 4.2795 | $^tR_t$: −4.4781 | $t_c = -0.0396$ | |
| | | | | PERIOD $P_Z = 60.4580$ sec. | |

TABLE III

CALCULATION OF DISPLACEMENT

| Set 4 | | $\omega_{qc}t$ | | $\sin\omega_{qc}t$ | | |
|---|---|---|---|---|---|---|
| $P_c$ | 409.5344 | | | | $\Sigma$Sines | 0.921460 |
| $'R_i$ | −32.7607 | −28°-47'-53.5" | | −.481726 | 1+Q | 1.959128 |
| $T_c$ | − 0.742 | − 0°-39'-08.1" | | −.011384 | $\psi_c$ | 2.126112 |
| $'L_i$ | +29.6764 | +26°-05'-13.0" | | +.439734 | | |
| $\omega_{qc}$ | | 0°-52.7428'=0,0153487056 rad/sec | | | S | −0.024204 |

| Set 5 | | $\omega_{qz}t$ | | $\sin\omega_{qz}t$ | | |
|---|---|---|---|---|---|---|
| $P_z$ | 60.458 | | | | $\Sigma$sines | 0.872974 |
| $'R_i$ | −4.5177 | −26°-54'-03.1" | | −.452448 | 1+Q | 1.96052 |
| $t_c$ | −.0396 | −0°-14'-08.9" | | −.004116 | $\psi_z$ | 2.230464 |
| $'L_i$ | +4.2399 | 25°-14'-48.0" | | +.426516 | | |
| $\omega_{qz}$ | | 357.272817'=0,103958390 rad/sec. | | | S | −0.009180 |

TABLE IV

FINAL ADJUSTMENT

| | | | | | | | |
|---|---|---|---|---|---|---|---|
| HC | | 0°-02-00 | 359-58-00 | 0°-02-00 | 359°-58-00 | 0°-02-00 | 359°-58-00 |
| Sets | | 2,3 | 4,5 | 6,7 | 8,9 | 10,11 | 12,13 |
| k | | .198245 | .198462 | .198271 | .197932 | .197994 | .197557 |
| S | | .021429 | −.024255 | .022387 | −.024892 | .024477 | −.019632 |
| S | | −.018017 | −.009180 | −.010240 | −.015699 | −.001441 | +.009248 |
| S(1·k) | | .025677 | −.029008 | .026826 | −.029818 | .029323 | −.023510 |
| −S.k | | .003572 | .001822 | .022030 | .003107 | .000285 | .001827 |
| $\alpha_d$ | | .029349 | −.027186 | .028856 | −.026711 | .029608 | −.025337 |
| $\Delta\alpha_d$ | | 056435 | 056042 | 055564 | 056319 | 054945 | |
| | $\Delta$HC | 240" | 240" | 240" | 240" | 240" | |
| | Factor $\omega$ | 4252.7" | 4282.5" | 4319.3" | 4261.4" | 4368.0" | |
| $\theta'$ | | −2'-04.4" | +1'-55.6" | −2'-04.6" | +1'-55.4" | −2'-06.2" | +1'-50.7" |
| $\theta''$ | | | +1' -56.4" | −2'-03.6" | +1'-53.8" | -2'-09.3" | |
| $\theta_{mean}$ | | −2'-04.4" | +1'-56.0" | −2'-04.1" | +1'-54.6" | -2'-07.7" | +1'-50.7" |
| $\alpha_N$ | | 0°-00'-4.4" | 359-4.0" | 4.1" | 5.4" | 7.7" | 9.3" |
| NORTH$_{AZ}$ | | 359-59-556' | ---56.0" | ----55.9" | ---54.6" | ----52.3" | ---50.7" |
| RO+$_{collim}$ | | 356°-37'-37.6" | ----38.4 | ----37.4 | ----37.7 | ----34.3 | ---31.9" |
| +E | | 0°-39-50.3" | ----50.3 | ----50.3 | ----50.3 | ----50.3 | ---50.3 |
| RO$_{AZ}$ | | 357-17-32.3 | ----32.7 | ----31.8 | ----33.4 | ----32.3 | ---31.5 |
| MEAN | | 357°-17'-32.3±0.3" | | | | | |
| V | | 0-00-00 | +0.4" | -0.5" | +1.1" | 0.0 | -0.8" |

TABLE V

CALCULATION OF k SET (4–5)

$\phi = 45°\ 19'\ 39''$     W.L. = 4081.20
$\cos\phi = 0.70305$
$P_z = 60.458$ seconds
$P_c = 409.5344$ seconds $$x = \frac{0.000072921151 \times 4081.20 \times .70305 \times (409.5344)^2}{78.956832}$$

= 444.445
$x^2$ = 197531.358
$y$ = 183185.734
$\Sigma$ = 380717.092
$\sqrt{\Sigma}$ = 617.023
$\div x$ (444.445)
N = 1061.468
$\tau$ = 1061.468 × 0.0072921151 × 0.70305
  = 0.054418

$D = \dfrac{4\pi^2}{60.548^2} = 0.010800$ $K = \dfrac{0.010800}{0.054418} = 0.198464$

We claim:
1. The method of determining North by gyrocompassing in which a gyrocompass having one degree of freedom has its rotor spin axis in the horizontal plane and is suspended by a filar band for oscillation about a vertical axis in the band as a torsion pendulum, which comprises:
   observing and recording the times of transit of the spin axis while the rotor is spinning across a fixed point located close to the Meridional plane which includes and oscillation axis, and across a pair of fixed points located approximately equiangularly distant East and West from said Meridional plane;
   observing and recording times of transit of the spin axis with the rotor non-spinning during a plurality of oscillatory swings across said fixed points;
   establishing from said timing observations a mean period $P_c$ and a mean period $P_z$ respectively for said spinning and non-spinning swings;
   establishing quasi-angular velocities $\omega_q$ of a Simple Harmonic Motion:

$$x = A.\sin\omega_q t$$

such that:

$$\omega_{qc} = 2\pi/P_c$$

and $$\omega_{zq} = 2\pi/P_z$$

establishing from said time measurements the time intervals $t_R$ and $t_L$ defined by successive transits of the spin axis across the Meridional and East pair of fixed points and across the Meridional and West pair of fixed points;

establishing the apparent offset distances of the near-Meridional fixed point from the equilibrium North direction represented by the differences from the half-period times $P_c/2$ and $P_z/2$ of the mean periods of swings East and West as respective time time intervals $t_C$ and $t_c$;

establishing the apparent amplitude A of said Simple Harmonic Motion as $$A_c = \frac{1 + \frac{\sin \omega_q t_C - \sin \omega_q t_L}{\sin \omega_q t_R - \sin \omega_q t_C}}{\sin \omega_q t_L - \sin \omega_q t_R}$$

$$A_z = \frac{1 + \frac{\sin \omega_q t_c - \sin \omega_q t_L}{\sin \omega_q t_L - \sin \omega_q t_c}}{\sin \omega_q t_L - \sin \omega_q t_R}$$

deriving angular representations of the differences S between the equilibrium direction and the near-Meridional fixed point expressed as an angular distance in units of time interval $t_R$ as $S_c = A_c \cdot \sin \omega_q t_C$ $S_z = A_z \cdot \sin \omega_q t_c$ and establishing the true direction of North from the angular difference n between the direction determined by the fixed near-Meridional point and North as $n = [1 + k]S - kS_z$ where $k$ is the ratio of the torsion torque of the band to the torque $\tau$ due to the directive moment of Earth's centripetal force, derived from the periods of spinning and non-spinning swings as observed.

2. The method of claim 1 wherein the timing observations are carried out with an accuracy of one millisecond of time for all intervals.

3. The method of claim 2 wherein the direction of the spin axis is represented by a light beam projected as a narrow vertical band having a width in the direction of swing of the order of 120 microns and said fixed points are realized as photosensitive spot area elements providing electrical outputs for beam crossings.

4. The method of claim 3 wherein said elements are disposed on the gyrocompass and the swing axis of the gyroscope is aligned with the vertical center of a theodolite associated with the gyrocompass.

5. The method of claim 3 wherein the gyrocompass is mounted on a theodolite having the vertical through its center aligned with the swing axis, and said elements are mounted on the telescope of the theodolite.

6. The method of claim 1 wherein the quantity $k$ is calculated as $$k = (4\pi^2/P_z^2)/[x + \sqrt{x^2 + y}]\Omega\cos\phi$$

where:

$x = (\Omega\cos\phi W.LP_c^2)/8\pi^2$ $y = W.L.[P_c^2/P_z^2 - 1]$ $\Omega$ is the angular velocity of Earth's rotation about the polar axis;

$\phi$ is the latitude of the observation $W$ is the weight of the spinning member $L$ is the distance from the point of suspension to the mass center of the swinging gyroscope.

7. The method of claim 1 wherein the spinning swing observtions precede the non-spinning swing observations, the spinning rotor is braked immediately following the spinning swing observations, and the non-spinning observations commence when the rotor has stopped, further comprising the steps of taking the arithmetical mean of the half-periods of swings to each side to derive $P_{c/2}$ and $P_{z/2}$;

establishing the drift of the parameter $$D = 4\pi^2/P_z^2$$

to the instant of time of the commencement of the non-spinning swings by the rates of decrement $r_A$, $r_B$, $r_a$, $r_b$ of the half-period times to the left and right respectively for spinning and non-spinning swings, establishing the angle S between the equilibrium direction of the gyroscope and the near-Meridional fixed point as $S_{(A, B, a, b)} = [(2n - 1)/4 + \mu] \cdot r_{(A, B, a, b)} +$ period arithmetical mean, where $n$ is the number of swings considered for the side, $\mu$ is the proportional time of braking and is equal to zero for non-spinning swing observations.

* * * * *